US012578702B2

(12) United States Patent
Jones et al.

(10) Patent No.: US 12,578,702 B2
(45) Date of Patent: Mar. 17, 2026

(54) APPARATUS AND METHOD FOR CALIBRATING FOR SKEW WITHOUT INDEPENDENT REFERENCE OBJECT AND FOR COMPENSATING FOR COEFFICIENT OF THERMAL EXPANSION AND MOISTURE ABSORPTION

(71) Applicant: Markforged, Inc., Watertown, MA (US)

(72) Inventors: Bruce David Jones, Sudbury, MA (US); Joseph Roy-Mayhew, Watertown, MA (US); Jessica Faust, Tyngsborough, MA (US); Benjamin Gallup, Acton, MA (US); David Steven Benhaim, Miami, FL (US)

(73) Assignee: MARKFORGED, INC, Waltham, MA (US)

( * ) Notice: Subject to any disclaimer, the term of this patent is extended or adjusted under 35 U.S.C. 154(b) by 563 days.

(21) Appl. No.: 17/979,244

(22) Filed: Nov. 2, 2022

(65) Prior Publication Data

US 2023/0141459 A1 May 11, 2023

Related U.S. Application Data

(60) Provisional application No. 63/276,743, filed on Nov. 8, 2021.

(51) Int. Cl.
*G05B 19/4099* (2006.01)

(52) U.S. Cl.
CPC ............... *G05B 19/4099* (2013.01); *G05B 2219/49023* (2013.01)

(58) Field of Classification Search
CPC ...... G05B 19/4099; G05B 2219/49023; G05B 2219/37129; G05B 2219/49007; G05B 19/401; G05B 19/404; G05B 2219/49219; B33Y 50/02; B33Y 10/00; B33Y 30/00; B33Y 50/00
See application file for complete search history.

(56) References Cited

U.S. PATENT DOCUMENTS

| | | |
|---|---|---|
| 9,149,988 B2 | 10/2015 | Mark et al. |
| 9,186,846 B1 | 11/2015 | Mark et al. |
| 9,186,848 B2 | 11/2015 | Mark et al. |
| 9,370,896 B2 | 6/2016 | Mark |
| 9,539,762 B2 | 1/2017 | Durand et al. |
| 9,579,851 B2 | 2/2017 | Mark et al. |

(Continued)

OTHER PUBLICATIONS

U.S. Appl. No. 63/138,987, filed Jan. 19, 2021; first named inventor: Bruce David Jones.

*Primary Examiner* — Eric J Yoon
(74) *Attorney, Agent, or Firm* — PEARL COHEN ZEDEK LATZER BARATZ LLP

(57) ABSTRACT

A 3D printing apparatus and method corrects for skew in the motion components of the apparatus without the use of an independent reference object. A calibration object having features therein or thereon is printed. A user rotates the calibration object by a certain angle after it is printed. The features in/on the calibration object are measured, and an amount of skew is determined based on the measurements. In addition, a 3D printing operation is compensated based on the effects of a coefficient of thermal expansion and/or moisture absorption on dimensional changes.

18 Claims, 17 Drawing Sheets

S600

S610 — Execute 3D-printing operation to print a 3D calibration object (and optionally one or more reference calibration objects)

S620 — Instruct user to remove calibration object from build platen

S630 — Instruct user to rotate calibration object by preset angle

S640 — (Optional) Measure gap between calibration object and reference alignment object(s)

S650 — Perform measurement scans of features of calibration object

S660 — Determine the amount of X-Y skew based on measurement scans of calibration object features

END

(56)  References Cited

U.S. PATENT DOCUMENTS

| | | | |
|---|---|---|---|
| 9,688,028 | B2 | 6/2017 | Mark et al. |
| 9,694,544 | B2 | 7/2017 | Mark et al. |
| 9,815,268 | B2 | 11/2017 | Mark et al. |
| 10,000,011 | B1 | 6/2018 | Mark |
| 10,076,876 | B2 | 9/2018 | Mark et al. |
| 10,464,131 | B2 | 11/2019 | Mark |
| 10,800,108 | B2 | 10/2020 | Mark et al. |
| 10,814,558 | B2 | 10/2020 | Parangi |
| 10,828,698 | B2 | 11/2020 | Mark |
| 10,953,609 | B1 | 3/2021 | Mark |
| 2015/0042755 | A1* | 2/2015 | Wang .................... B29C 64/386 348/46 |
| 2016/0107379 | A1 | 4/2016 | Mark et al. |
| 2017/0066193 | A1* | 3/2017 | Kim ...................... B29C 64/241 |
| 2018/0086001 | A1* | 3/2018 | Kim ........................ B22F 10/31 |
| 2019/0009472 | A1 | 1/2019 | Mark |
| 2020/0114422 | A1 | 4/2020 | Mark et al. |
| 2020/0143006 | A1 | 5/2020 | Matusik et al. |
| 2020/0156322 | A1* | 5/2020 | Yorozu .................. B33Y 50/02 |
| 2020/0361155 | A1 | 11/2020 | Jones et al. |
| 2020/0371509 | A1 | 11/2020 | Mark |
| 2023/0289947 | A1* | 9/2023 | Tasan ....................... G01N 3/46 |

* cited by examiner

Side View

Top View

300

310

320

S600

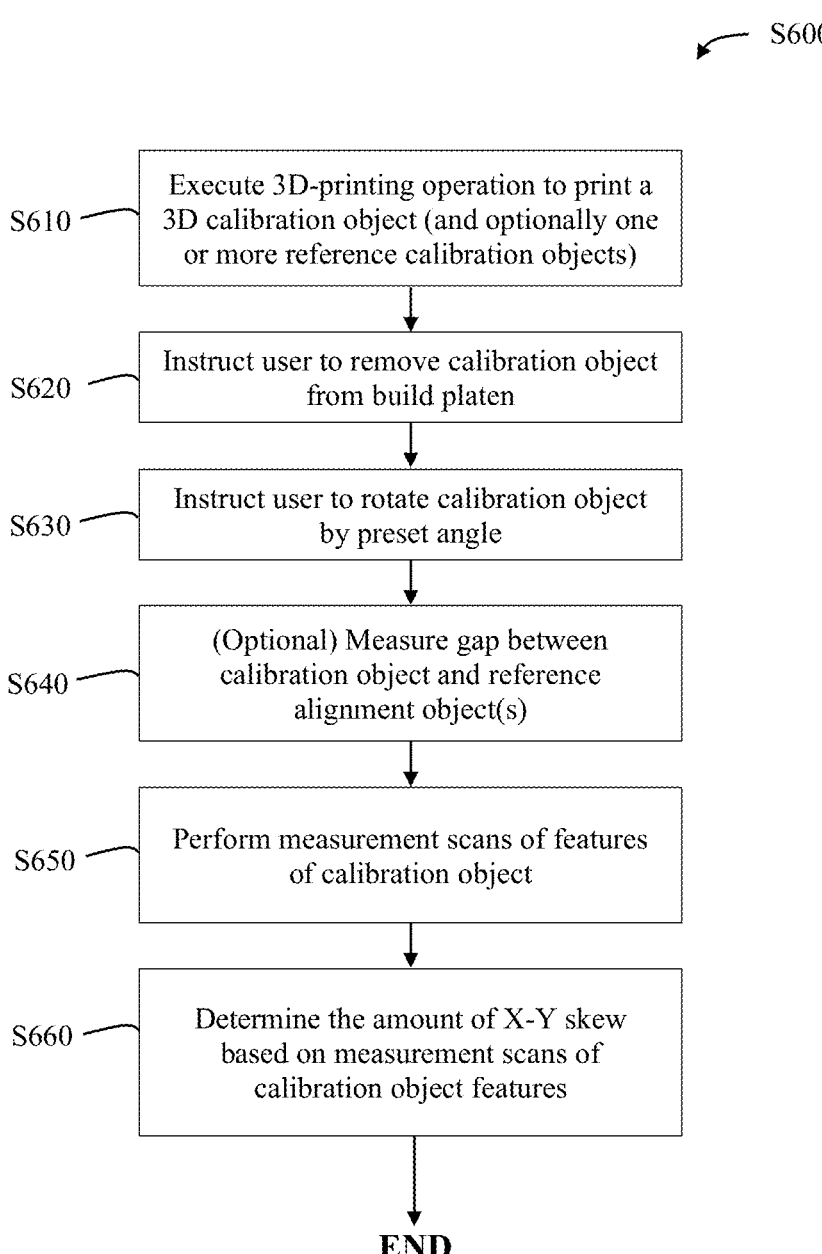

S610 — Execute 3D-printing operation to print a 3D calibration object (and optionally one or more reference calibration objects)

S620 — Instruct user to remove calibration object from build platen

S630 — Instruct user to rotate calibration object by preset angle

S640 — (Optional) Measure gap between calibration object and reference alignment object(s)

S650 — Perform measurement scans of features of calibration object

S660 — Determine the amount of X-Y skew based on measurement scans of calibration object features

END

S1410 — Receive 3D print file and target environmental conditions for completed 3D object S1420 — Modify 3D print file based on (i) difference between print and target environmental conditions and (ii) CTE and/or moisture absorption compensation information S1430 — Execute 3D-printing operation to print modified 3D print file

END

APPARATUS AND METHOD FOR CALIBRATING FOR SKEW WITHOUT INDEPENDENT REFERENCE OBJECT AND FOR COMPENSATING FOR COEFFICIENT OF THERMAL EXPANSION AND MOISTURE ABSORPTION

This application claims priority to U.S. Provisional Application No. 63/276,743, filed Nov. 8, 2021, which is incorporated by reference herein in its entirety.

FIELD OF THE INVENTION

The invention relates to an apparatus and method for calibrating for skew without requiring an independent reference object. The invention also relates to an apparatus and method for compensating for coefficient of thermal expansion and moisture absorption.

BACKGROUND OF THE INVENTION

A 3D printing system may include movement components (e.g., motors, rails, etc.) to independently move printing components in X, Y, and Z directions. However, if the movement components are not precisely aligned at correct angles (e.g., right angles) with each other and are skewed, such skew can result in inaccurate 3D printed parts.

One approach to performing skew calibration in a 3D printing system is to use an independent reference object, measuring features within the independent reference object that exposes skew. For example, the independent reference object may be arranged as a known square object, which may be measured by the 3D printing system to assess the extent of skew. However, an independent reference object may be expensive to produce, and may not always be available, Therefore, a need exists for the ability to perform skew detection and correction (e.g., in the X-Y direction) without requiring an independent reference object. A need further exists for the ability to perform skew detection and correction in the X-Y, X-Z, and/or Y-Z directions. A need also exists for the ability to compensate for any deviations in the dimensional accuracy of a 3D-printed part due to the effects of thermal expansion (e.g., differences in coefficient of thermal expansion) and/or moisture absorption.

SUMMARY OF THE INVENTION

One aspect of the present invention relates to an apparatus comprising at least one processor; and at least one memory, wherein the at least one memory stores computer-readable instructions which, when executed by the at least one processor, cause the processor to: control a printer component to print a 3D object, the 3D object containing a first feature extending along a first direction and a second feature extending along a second direction different from the first direction; receive, after the 3D object has been printed and has been rotated by a predetermined angle, measurement data corresponding to positional measurements of the first feature and the second feature; and determine an amount of skew of the printer component, based on the received measurement data.

Another aspect of the present invention relates to a method comprising controlling, by at least one processor, a printer component to print a 3D object, the 3D object containing a first feature extending along a first direction and a second feature extending along a second direction different from the first direction; receiving, by at least one processor, after the 3D object has been printed and has been rotated by a predetermined angle, measurement data corresponding to positional measurements of the first feature and the second feature; and determining, by at least one processor, an amount of skew of the printer component, based on the received measurement data.

Yet another aspect of the present invention relates to an apparatus comprising at least one processor; and at least one memory, wherein the at least one memory stores computer-readable instructions which, when executed by the at least one processor, cause the processor to: receive a 3D design file corresponding to a 3D object to be printed; receive information corresponding to a 3D printing material in which to print the 3D object; and generate a 3D production file based on the 3D design file, the information corresponding to the 3D printing material, and correction information corresponding to the 3D printing material, wherein the correction information includes information correcting for the coefficient of thermal expansion or moisture absorption of the 3D printing material.

Still yet another aspect of the present invention relates to a method comprising receiving a 3D design file corresponding to a 3D object to be printed; receiving information corresponding to a 3D printing material in which to print the 3D object; and generating a 3D production file based on the 3D design file, the information corresponding to the 3D printing material, and correction information corresponding to the 3D printing material, wherein the correction information includes information correcting for the coefficient of thermal expansion or moisture absorption of the 3D printing material.

Another aspect of the present invention relates to an apparatus comprising at least one processor; and at least one memory, wherein the at least one memory stores computer-readable instructions which, when executed by the at least one processor, cause the processor to: receive a 3D production file corresponding to a 3D object to be printed; receive one or more target environmental conditions for the service condition in which the 3D object is intended to be used; receive one or more apparatus environmental condition measurements corresponding to the environmental condition of the apparatus; and modify the 3D production file based on the target environmental conditions, the one or more apparatus environmental condition measurements, and one or more relationships between (i) a change in dimension based on coefficient of thermal expansion or moisture absorption and (ii) a change in an environmental condition.

Yet another aspect of the present invention relates to a method comprising receiving a 3D production file corresponding to a 3D object to be printed; receiving one or more target environmental conditions for the service condition in which the 3D object is intended to be used; receiving one or more apparatus environmental condition measurements corresponding to the environmental condition of the apparatus; and modifying the 3D production file based on the target environmental conditions, the one or more apparatus environmental condition measurements, and one or more relationships between (i) a change in dimension based on coefficient of thermal expansion or moisture absorption and (ii) a change in an environmental condition.

These and other aspects of the invention will become apparent from the following disclosure.

BRIEF DESCRIPTION OF THE DRAWINGS

FIG. 6 is a flow chart for performing skew calibration of a 3D printer, in accordance with one embodiment.

DETAILED DESCRIPTION OF THE
PREFERRED EMBODIMENTS

One aspect of the invention is an apparatus and method for detecting skew in a 3D printing system without the use of an independent reference object. Another aspect of the invention is an apparatus and method for compensating for CTE and moisture absorption in a 3D printing system.

3D Printer Apparatus

Figure 1A:
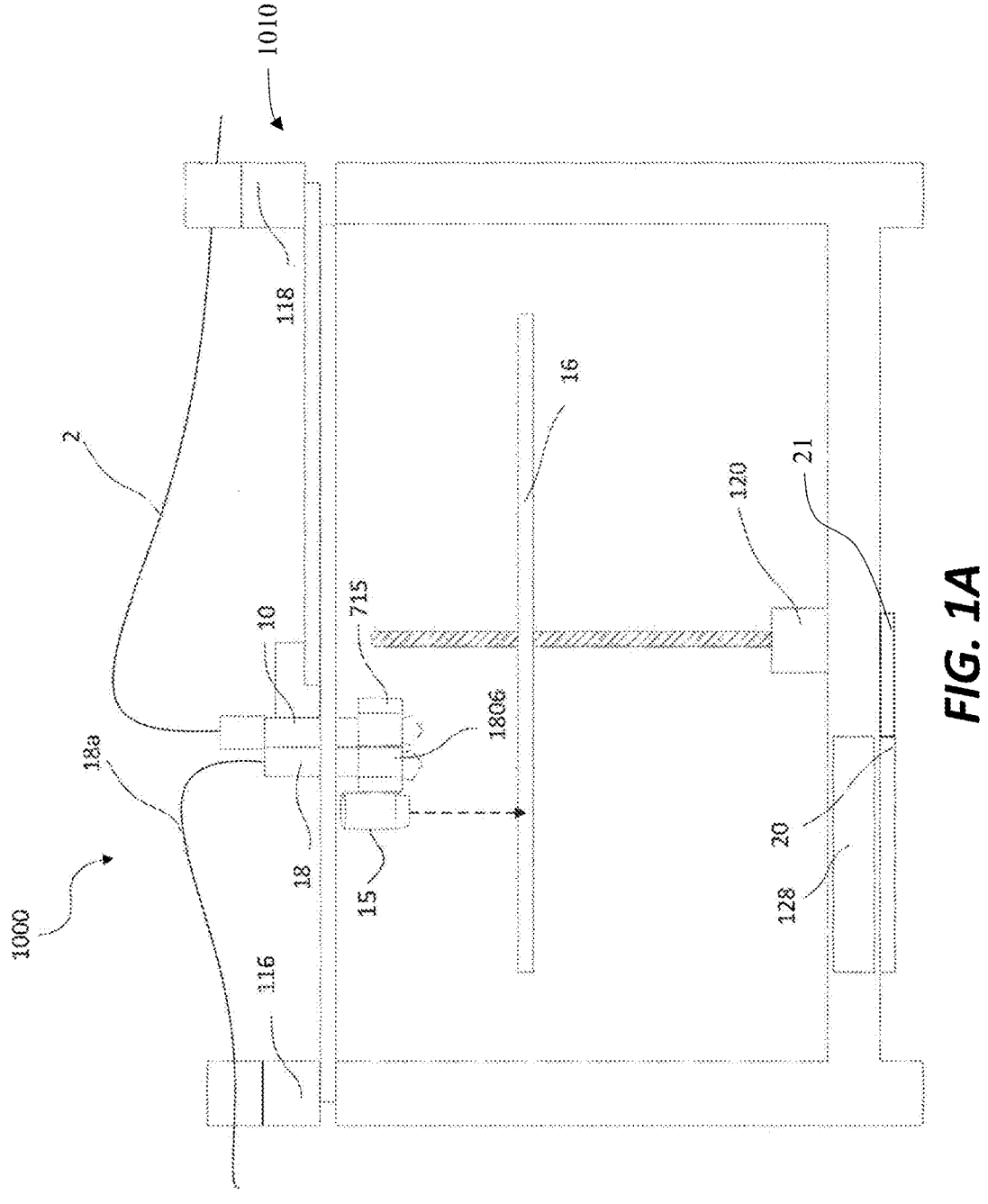
FIGS. 1A and 1B illustrate an apparatus, in accordance with one embodiment.
Figure 1B:
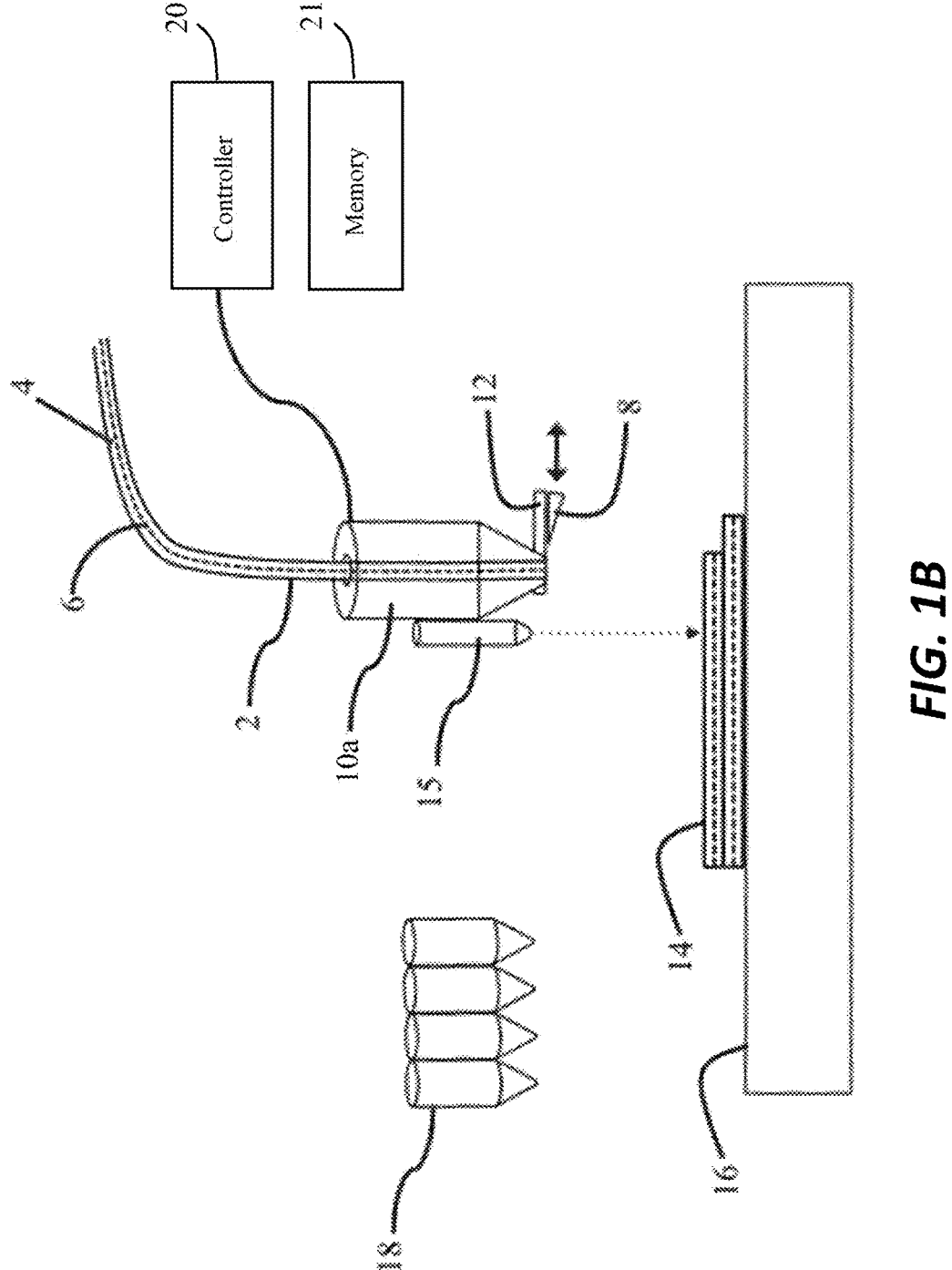

FIGS. 1A-1B illustrate an apparatus 1000 in accordance with one embodiment of the invention. The apparatus 1000 includes one or more controllers 20, one or more memories 21, and one or more print heads 10, 18. For instance, one head 10 may deposit a metal or fiber reinforced composite filament 2, and another head 18 may apply pure or neat matrix resin 18a (thermoplastic or curing), which may include, but is not limited to, a polymer or curable monomer and/or a polymer or curable monomer filled, e.g., with chopped carbon fiber, carbon black, silica, and/or aramid fiber. In the case of the filament 2 being a fiber reinforced composite filament, such filament (also referred to herein as continuous core reinforced filament) may be substantially void free and include a polymer or resin that coats, permeates or impregnates an internal continuous core (including, but not limited to, single, multi-strand, or multi-material). It should be noted that although the print head 18 is shown as an extrusion print head, "fill material print head" 18 as used herein includes optical or UV curing, heat fusion or sintering, or "polyjet", liquid, colloid, suspension or powder jetting devices (not shown) for depositing fill material. It will also be appreciated that a material bead formed by the filament 10a may be deposited as extruded thermoplastic or metal, deposited as continuous or semi-continuous fiber, solidified as photo or UV cured resin, or jetted as metal or binders mixed with plastics or metal, or are structural, functional or coatings. The fiber reinforced composite filament 2 (also referred to herein as continuous core reinforced filament) may be a push-pulpreg that is substantially void free and includes a polymer or resin 4 that coats or impregnates an internal continuous single core or multistrand core 6. The apparatus includes heaters 715, 1806 to heat the print heads 10, 18, respectively so as to facilitate deposition of layers of material to form the object 14 to be printed. A cutter 8 controlled by the controller 20 may cut the filament 2 during the deposition process in order to (i) form separate features and components on the structure as well as (ii) control the directionality or anisotropy of the deposited material and/or bonded ranks in multiple sections and layers. As depicted, the cutter 8 is a cutting blade associated with a backing plate 12 located at the nozzlet outlet. Other cutters include laser, high-pressure air or fluid, or shears. The apparatus 1000 may also include additional non-printing tool heads, such as for milling, SLS, etc.

The apparatus 1000 includes a gantry 1010 that supports the print heads 10, 18. The gantry 1010 includes motors 116, 118 to move the print heads 10, 18 along X and Y rails in the X and Y directions, respectively. The apparatus 1000 also includes a build platen 16 (e.g., print bed) on which an object to be printed is formed. The height of the build platen 16 is controlled by a motor 120 for Z direction adjustment. Although the movement of the apparatus has been described based on a Cartesian arrangement for relatively moving the print heads in three orthogonal translation directions, other arrangements are considered within the scope of, and expressly described by, a drive system or drive or motorized drive that may relatively move a print head and a build plate supporting a 3D printed object in at least three degrees of freedom (i.e., in four or more degrees of freedom as well). For example, for three degrees of freedom, a delta, parallel robot structure may use three parallelogram arms connected to universal joints at the base, optionally to maintain an orientation of the print head (e.g., three motorized degrees of freedom among the print head and build plate) or to change the orientation of the print head (e.g., four or higher degrees of freedom among the print head and build plate). As another example, the print head may be mounted on a robotic arm having three, four, five, six, or higher degrees of freedom; and/or the build platform may rotate, translate in three dimensions, or be spun.

The apparatus 1000 also includes various environmental sensors (not shown) such as a temperature sensor (e.g., thermistor), humidity sensor (e.g., hygrometer), moisture sensor, and/or other environmental sensors.

FIG. 1B depicts an embodiment of the apparatus 1000 applying the filament 2 to build a structure. In one embodiment, the filament 2 is a metal filament for printing a metal object. In one embodiment, the filament 2 is a fiber reinforced composite filament (also referred to herein as continuous core reinforced filament) may be a push-pulpreg that is substantially void free and includes a polymer or resin 4 that coats or impregnates an internal continuous single core or multistrand core 6.

The filament 2 is fed through a nozzlet 10a disposed at the end of the print head 10, and heated to extrude the filament material for printing. In the case that the filament 2 is a fiber reinforced composite filament, the filament 2 is heated to a controlled push-pultrusion temperature selected for the matrix material to maintain a predetermined viscosity, and/ or a predetermined amount force of adhesion of bonded ranks, and/or a surface finish. The push-pultrusion may be greater than the melting temperature of the polymer 4, less than a decomposition temperature of the polymer 4 and less than either the melting or decomposition temperature of the core 6.

After being heated in the nozzlet 10a and having its material substantially melted, the filament 2 is applied onto the build platen 16 to build successive layers 14 to form a three dimensional structure. One or both of (i) the position and orientation of the build platen 16 or (ii) the position and orientation of the nozzlet 10 are controlled by a controller 20 to deposit the filament 2 in the desired location and direction. Position and orientation control mechanisms include gantry systems, robotic arms, and/or H frames, any of these equipped with position and/or displacement sensors to the controller 20 to monitor the relative position or velocity of nozzlet 10a relative to the build platen 16 and/or the layers 14 of the object being constructed. The controller 20 may use sensed X, Y, and/or Z positions and/or displacement or velocity vectors to control subsequent movements of the nozzlet 10a or platen 16. The apparatus 1000 may optionally include a laser scanner 15 to measure distance to the platen 16 or the layer 14, displacement transducers in any of three translation and/or three rotation axes, distance integrators, and/or accelerometers detecting a position or movement of the nozzlet 10a to the build platen 16. The laser scanner 15 may scan the section ahead of the nozzlet 10a in order to correct the Z height of the nozzlet 10a, or the fill volume required, to match a desired deposition profile. This measurement may also be used to fill in voids detected in the object. The laser scanner 15 may also measure the object after the filament is applied to confirm the depth and position of the deposited bonded ranks. Distance from a lip of the deposition head to the previous layer or build platen, or the height of a bonded rank may be confirmed using an appropriate sensor.

Various 3D-printing aspects of the apparatus 1000 are described in detail in U.S. Patent Application Publication No. 2019/0009472, which is incorporated by reference herein in its entirety.

Laser Scanner

Various aspects of the laser scanner 15 will now be discussed. The laser scanner 15 may scan the section ahead of the next deposition in order to correct the Z height of the nozzlet 10a, or the fill volume required, to match a desired deposition profile. This measurement may also be used to fill in voids detected in the part. The laser scanner 15 may measure the object after the filament is applied to confirm the depth and position of the deposited bonded ranks. Distance from a lip of the deposition head to the previous layer or build platen, or the height of a bonded rank may be confirmed using an appropriate sensor, including the laser scanner 15.

Figure 2:
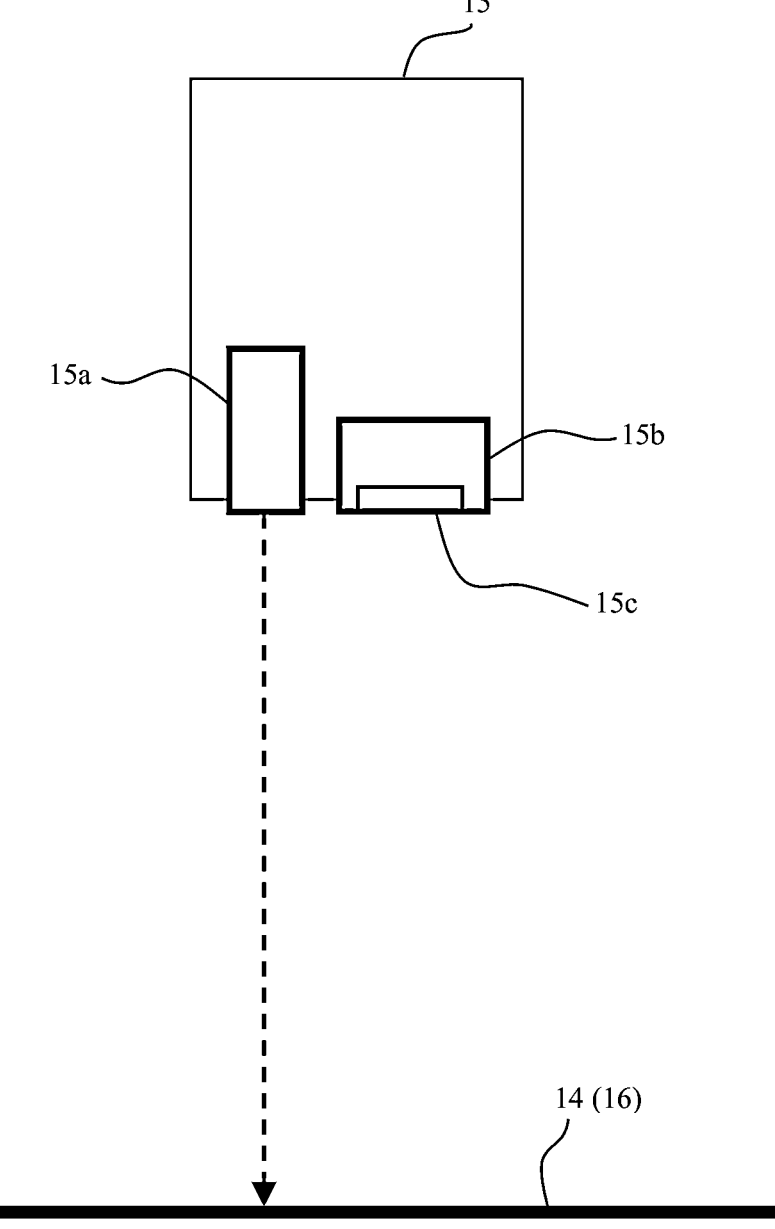
FIG. 2 illustrates a measurement component, in accordance with one embodiment.

The laser scanner 15 may be formed as a short-range laser scanner, a high resolution RGBD camera, a triangulating, time of flight, phase difference, or interferometric scanner, a structured light camera or sensor, or the like. As illustrated in FIG. 2, the laser scanner 15 includes a laser emitter 15a and a laser receiver 15b.

In one embodiment, the laser scanner 15 is mounted on (e.g., integral with) the print head 10. In another embodiment, the laser scanner 15 is mounted on an independent head coupled to the print head 10. In yet another embodiment, the laser scanner 15 is fixed to the apparatus 1000 (e.g., mounted to a chassis), and the object to be measured is moved relative to the laser scanner 15.

The laser emitter 15a emits a laser beam of a predetermined sized profile on the surface of the object to be scanned. In one embodiment, the laser emitter 15a is arranged such that the emitted laser beam is oriented generally downward at a predetermined angle relative to a vertical direction of the apparatus. In one embodiment, the predetermined angle is oblique. In one embodiment, the predetermined angle is in a range between 0 and 89 degrees relative to the vertical direction, preferably between 0 and 45 degrees, and even more preferably between 0 and 20 degrees.

In one embodiment, the predetermined angle of the emitted laser beam is zero, such that the laser beam is coincident with the vertical direction and oriented directly downward. In one embodiment, the laser beam is a circular (e.g., dot) profile. In one embodiment, the diameter of the laser dot is between 0.1 and 100 μm, preferably between 20 and 80 μm, and even more preferably between 40 and 60 μm. In one embodiment, the laser beam has a profile other than a circular profile, such as a line profile or a chevron profile.

The laser receiver 15b senses the laser beam emitted from the laser emitter 15a, incident and visible on a surface of the 3D-printed object. In one embodiment, the laser receiver includes an optical sensor 15c and an optical system (not shown). In one embodiment, the optical sensor 15c is a two-dimensional sensor, including but not limited to a CCD or CMOS sensor. In another embodiment, the optical sensor 15c is a line sensor. In one embodiment, the laser scanner 15 includes a vision system to analyze optical signals received from the optical sensor 15c.

The optical sensor 15c is arranged so as to face generally downward, at a predetermined angle relative to the vertical direction of the apparatus. In one embodiment, the predetermined angle is oblique. In one embodiment, the predetermined angle is in a range between 0 and 89 degrees relative to the vertical direction, preferably between 0 and 45 degrees, and even more preferably between 0 and 20 degrees. In one embodiment, the predetermined angle is zero, such that the optical detector is facing directly downward in the vertical direction.

In one embodiment, the laser beam emitted from the laser emitter 15a is aimed directly downwards, and the optical sensor 15c is likewise aimed directly downwards. In one embodiment, the laser beam emitted from the laser emitter 15a is aimed directly downwards, while the optical sensor 15c is oriented at an angle relative to the vertical direction, preferably in a range between 0 and 45 degrees relative to the vertical direction, even more preferably between 0 and 20 degrees, and even further more preferably between 0 and 5 degrees. In one embodiment, the laser emitter 15a and the laser receiver 15b are arranged to be as close to each other as possible.

The apparatus may rely on principles of triangulation to determine the distance (e.g., depth) between the laser scanner 15 and the surface of the object on which the laser beam is incident. In particular, the distance will affect the position of the laser beam as observed from the laser receiver's perspective. The distance may be determined based on where the laser beam is observed within the laser receiver's perspective.

It will be appreciated that laser scanning involves a line of sight between the laser emitter 15a and the sample point being scanned (so that the laser beam is incident on the sample point) and a line of sight between the optical sensor 15c and the sample point (so that the visualized laser beam incidence on the object is visible to the optical sensor).

In one embodiment, a touch probe is employed instead of (or in addition to) the laser scanner 15 to perform depth/distance measurements.

In one embodiment, the print nozzle is used instead of (or in addition to) the laser scanner 15 to perform a contact-sensing operation to perform depth/distance measurements. In particular, the apparatus 1000 is equipped with detection capabilities for detecting when the nozzle 10 (and/or nozzle 18) contacts the build platen 16, a print layer, and/or a print material bead. By moving the nozzle 10 along the X, Y, and/or Z directions and detecting when contact occurs between the nozzle 10 and the print layer, the apparatus 1000 may take measurements of sample points on the print layer. For example, the nozzle 10 may be moved to the X-Y position of the sample point and lowered until contact is detected, and the Z-position at the time of contact is used to determine the measurement.

Exemplary 3D Calibration Object and Reference Alignment Object(s)

Figure 3A:
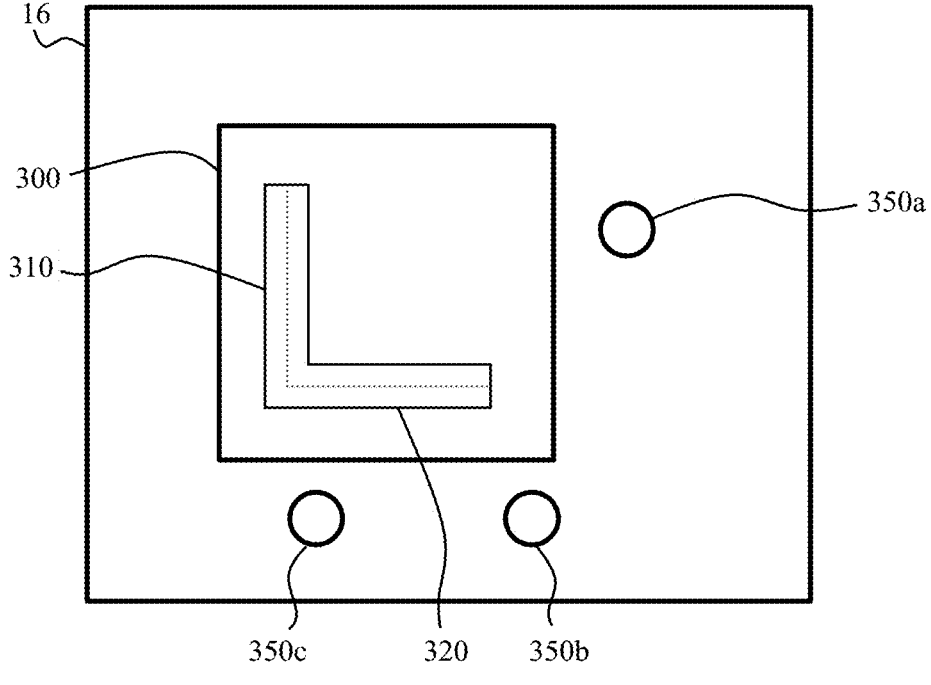
FIGS. 3A and 3B illustrate overhead and sectional views, respectively, of an exemplary 3D-printed calibration object and 3D-printed reference alignment objects, in accordance with one embodiment.
Figure 3B:
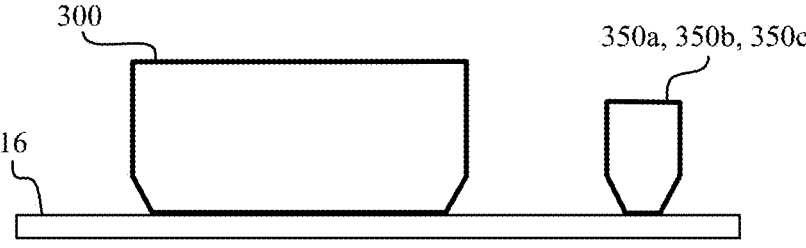

FIGS. 3A and 3B illustrate overhead and sectional views, respectively, of one non-limiting example of a 3D calibration object 300 and reference alignment objects 350a-c that may be printed and employed for skew calibration in accordance with the present invention. Desired objectives of the 3D calibration object 300 may include (i) resistance to errors due to inaccurate rotation, and (ii) resilience to deformation.

In one embodiment, the calibration object 300 may be formed as a block of material having one or more features 310, 320 formed therein or thereon. In one embodiment, the block is a cuboid. A cuboid or similar-shaped block may facilitate the user's abutment of the calibration object 300 with reference alignment object(s), as will be described later with reference to FIG. 6.

In one embodiment, one or more of the features 310, 320 are linear. In one embodiment, feature 310 is a first feature, and feature 320 is a second feature. In one embodiment, the second linear feature 320 is defined to be oriented 90° relative to the first linear feature 310, the first linear feature 310 and the second linear feature 320 collectively forming an L-shaped combined feature.

Figure 4:
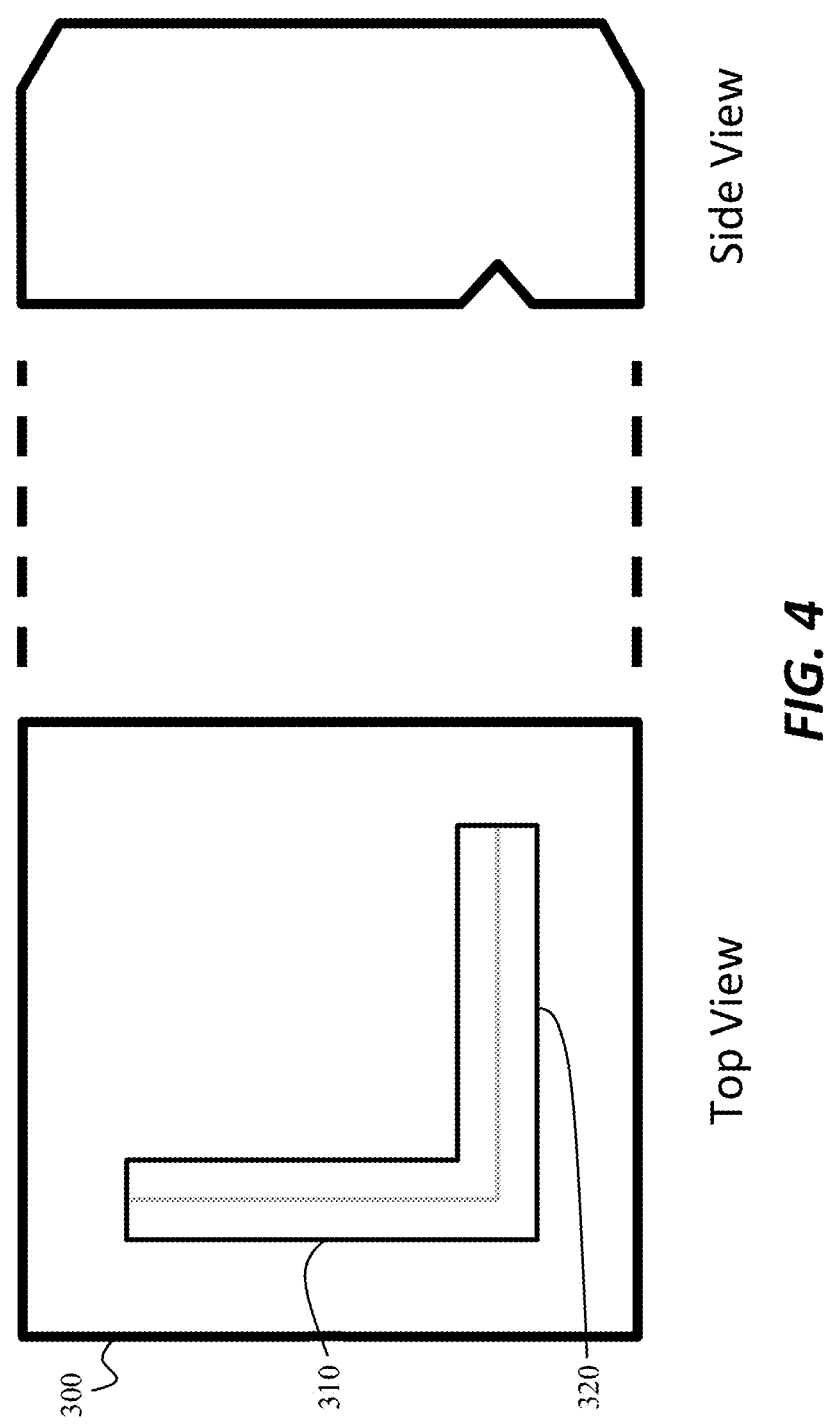
FIG. 4 illustrates comparative overhead and sectional views of an exemplary 3D-printed calibration object, in accordance with one embodiment.

In one embodiment, one or more of the features 310, 320 are grooves that are engraved and/or embossed in the block. In one embodiment, the block includes at least two grooves positioned at a right angle with respect to each other, combining to form an L-shaped feature. FIG. 4 illustrates comparative overhead and sectional views of the calibration object 300 in the case of the features 310, 320 being grooves.

In one embodiment, the grooves of the calibration object 300 are V-shaped grooves. V-shaped grooves may provide a benefit of being more accurately measured and being more dimensionally stable. Additionally, a V-shaped groove may provide a benefit of sub X-Y sampling resolution accuracy for determining the location of the center of the groove.

Figure 5A:
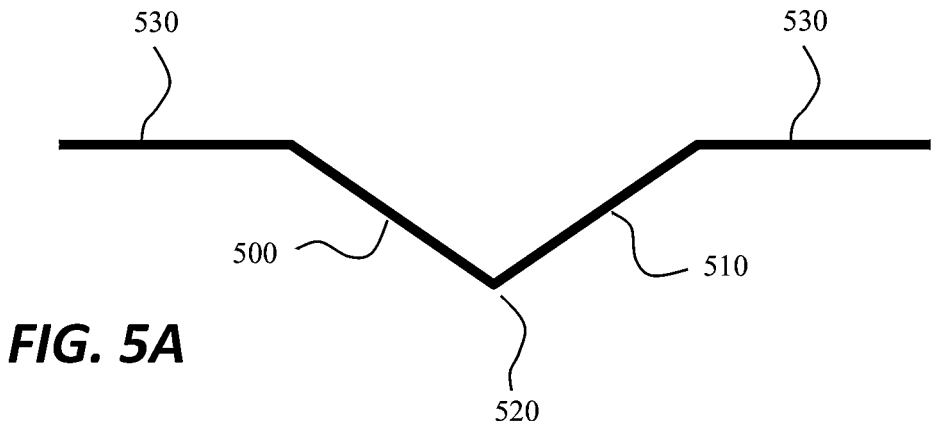
FIGS. 5A-5C are sectional views of various examples of groove features of a 3D-printed calibration object, in accordance with one or more embodiments.

FIG. 5A illustrates, in a sectional view, the profile of one example of a groove for the calibration object 300. In one embodiment, the profile of the groove includes a left slope

500 and a right slope 510 intersecting at a center point 520, thereby forming a V-shape into a top surface 530 of the calibration object 300. In one embodiment, the left slope 500 and the right slope 510 are symmetrical, and the center point 520 reflects the center of the groove.

Figure 5B:
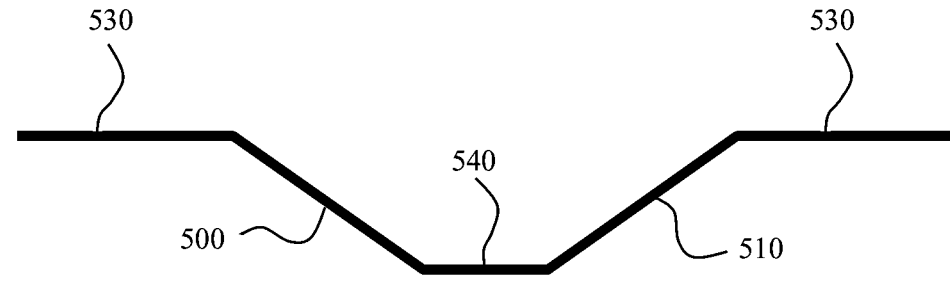

FIG. 5B illustrates, in a sectional view, the profile of another example of a groove for the calibration object 300. In one embodiment, the profile of the groove includes a left slope 500 and a right slope 510 intersecting at a lower landing 540, thereby forming a general V-shape into a top surface 530 of the calibration object 300. In one embodiment, the left slope 500 and the right slope 510 are symmetrical, and the lower landing 540 reflects the center of the groove.

Figure 5C:
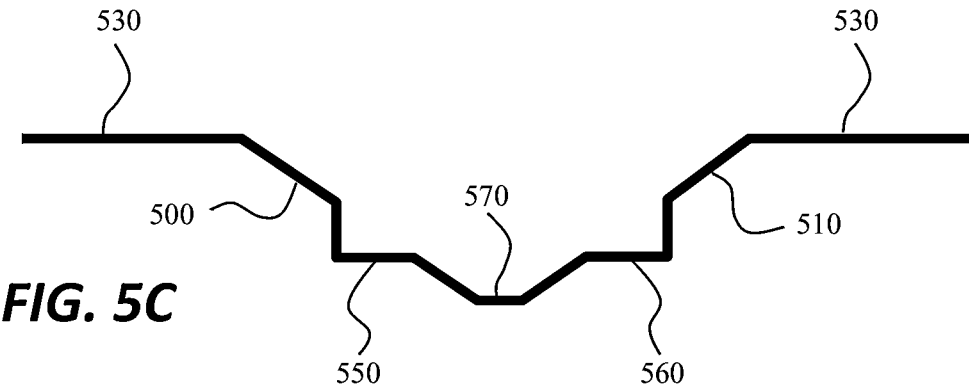

FIG. 5C illustrates, in a sectional view, the profile of yet another example of a groove for the calibration object 300. In one embodiment, the profile of the groove includes a left slope 500 and a right slope 510 intersecting at a lower landing 570, thereby forming a general V-shape into a top surface 530 of the calibration object 300. The groove also includes a mid-landing 550 along the left slope 500 and a mid-landing 560 along the right slope 510. In one embodiment, the left slope 500 and the right slope 510 are symmetrical, and the lower landing 540 reflects the center of the groove.

It will be appreciated that the 'V' angle of the V-shaped groove may be configured as any angle. In one embodiment, the 'V' angle is selected such that the angle does not impact the ability of the laser scanner 15 to scan the groove from every direction. In one embodiment, the 'V' angle is between 1-179 degrees, more preferably between 90-170 degrees, even more preferably between 105-155 degrees, and further more preferably between 120-150 degrees. In one embodiment, the 'V' angle is approximately 140 degrees.

It will be appreciated that, while the exemplary calibration object has been described based on an L-shaped combined groove, any other shape of groove may be employed with the invention (including non-linear grooves). For instance, a two-dimensional array of grooves may be formed on the calibration object, or a pattern (e.g., logo) or other shape (e.g., square, triangle, etc.) may be used for the arrangement of grooves. It will be additionally appreciated that projections protruding from the surface of the calibration object may be employed as an alternative to (or in combination with) grooves. It will also be appreciated that other shapes of grooves other than V-shape may be employed with the invention, while recognizing that measurement accuracy for certain shapes of grooves may be limited to the sampling resolution of the measuring component (rather than the sub-sampling resolution achievable using V-shaped grooves and the operation described above).

In one embodiment, the calibration object (i) may deform mostly isotropically due to thermal effects; and (ii) may be reasonably resilient to any permanent deformation that may result from removal from the build platen 16. It will be appreciated that the calibration object 300 may be formed of a shape other than a cuboid or block. As one non-limiting example, the calibration object 300 may be formed as an L-shaped bracket. However, it will be recognized that certain shapes for the calibration object 300 may be more prone to warp and therefore are less preferable.

With respect to the reference alignment object(s) 350a-c, these objects serve as reference points that allow the user to re-position the printed calibration object 300 on the build platen 16 with repeatable precision. As will be described below, the skew calibration operation may involve a user re-position a printed calibration object 300 so it abuts the printed reference alignment object(s) 350a-c. In one embodiment, the reference alignment object(s) 350a-c are columns. In one embodiment, three reference alignment object(s) 350a-c are used. However, it will be appreciated that any number of reference alignment objects may be employed for use with the present invention.

In one embodiment, the reference alignment object(s) 350a-c are sized so as to be abutted by the calibration object 300 without being moved or deformed. In one embodiment, the reference alignment object(s) 350a-c are held in place through adhesion with the build platen 350a-c and are sufficiently wide so as to achieve strong adhesion. In one embodiment, the reference alignment object(s) 350a-c are sufficiently tall that the calibration object 300 does not slide over them.

In one embodiment, the block of the calibration object 300 has recesses in its exterior that complement the shape of the reference alignment object(s) 350a-c. For example, the block may include cylindrical recesses at locations in alignment with the positioning of the reference alignment object(s) 350a-c when printed.

In one embodiment, one or more (e.g., all) of the calibration object 300 and/or the reference alignment object(s) 350a-c have a chamfer on the bottom edges, to prevent "elephants footing" (where a printed object may be unintentionally wider at the bottom) from potentially impacting the ability to subsequently place these objects in contact with one another on the build platen 16.

Skew Calibration Operation

FIG. 6 illustrates an operation S600 for performing skew calibration of a 3D printer, according to one embodiment.

First, in step S610, the controller 20 executes a 3D-printing operation to print a 3D calibration object 300 on the build platen 16. Optionally, the 3D-printing operation also includes the printing of one or more reference alignment objects 350a-c. In one embodiment, the calibration object 300 and reference alignment object(s) 350a-c are printed in a single build/print job. The calibration object 300 contains one or more features to be measured by a measurement component (e.g., laser scanner 15) of the apparatus 1000. In one embodiment, the calibration object 300 is defined such that two or more features are angled at a certain angle (e.g., 90 degrees) with respect to each other. FIGS. 3A-3B illustrate one example of the constructed calibration object 300 and reference alignment objects 350a-c.

In step S620, the controller 20 controls a user output component (e.g., display or speaker) to present an instruction (e.g., visual or voice prompt) to the user of the apparatus to detach the calibration object 300 from the build platen 16. In the case that reference alignment objects 350a-c were printed in step S610, the controller 20 may optionally also instruct the user to leave the reference alignment objects 350a-c on the build platen 16 and avoid contact with them.

In step S630, the controller 20 controls a user output component (e.g., display or speaker) to present an instruction to the user to rotate the calibration object 300 by a preset angle (e.g., 90 degrees). In the case that one or more reference alignment object(s) 350a-c were printed in step S610, the controller 20 presents an instruction to the user to, after performing the rotation of the calibration object 300 by the preset angle, position the calibration object 300 such that the calibration object 300 abuts and contacts the reference alignment object(s) 350a-c. Referring to the example illustrated in FIGS. 3A-3B of the printed calibration object 300 and reference alignment objects 350a-c, the user's rotation and re-positioning of the calibration object 300 so as to abut the reference alignment objects 350a-c, results in the arrangement illustrated in FIG. 7. The use of reference alignment object(s) 350a-c may minimize errors between intended and actual rotation angles, and may allow for repeatable precision.

In optional step S640, the controller 20 controls a measurement component (e.g., laser scanner 15) of the apparatus 1000 to measure the gap between the calibration object 300 and one or more (e.g., all) of the reference alignment object(s) 350a-c. In the case that the measured gap exceeds a threshold, the controller 20 controls a user output component (e.g., display or speaker) to present an instruction to the user to re-position the calibration object 300 to reduce the gap. While optional, this step provides confirmation that the user placed the calibration device 300 in the correct position in step S630.

In step S650, the controller 20 controls a measurement component (e.g., laser scanner 15) of the apparatus 1000 to measure the features of the calibration object 300. For instance, where the calibration object 300 includes first and second features, the controller 20 controls the measurement component to measure the dimensions and arrangement of these features. The controller 20 may control the measurement component to perform this step by collecting measurement readings at multiple locations along each feature of the calibration object 300. The controller 20 stores the measurement data in memory 21.

Figure 8:
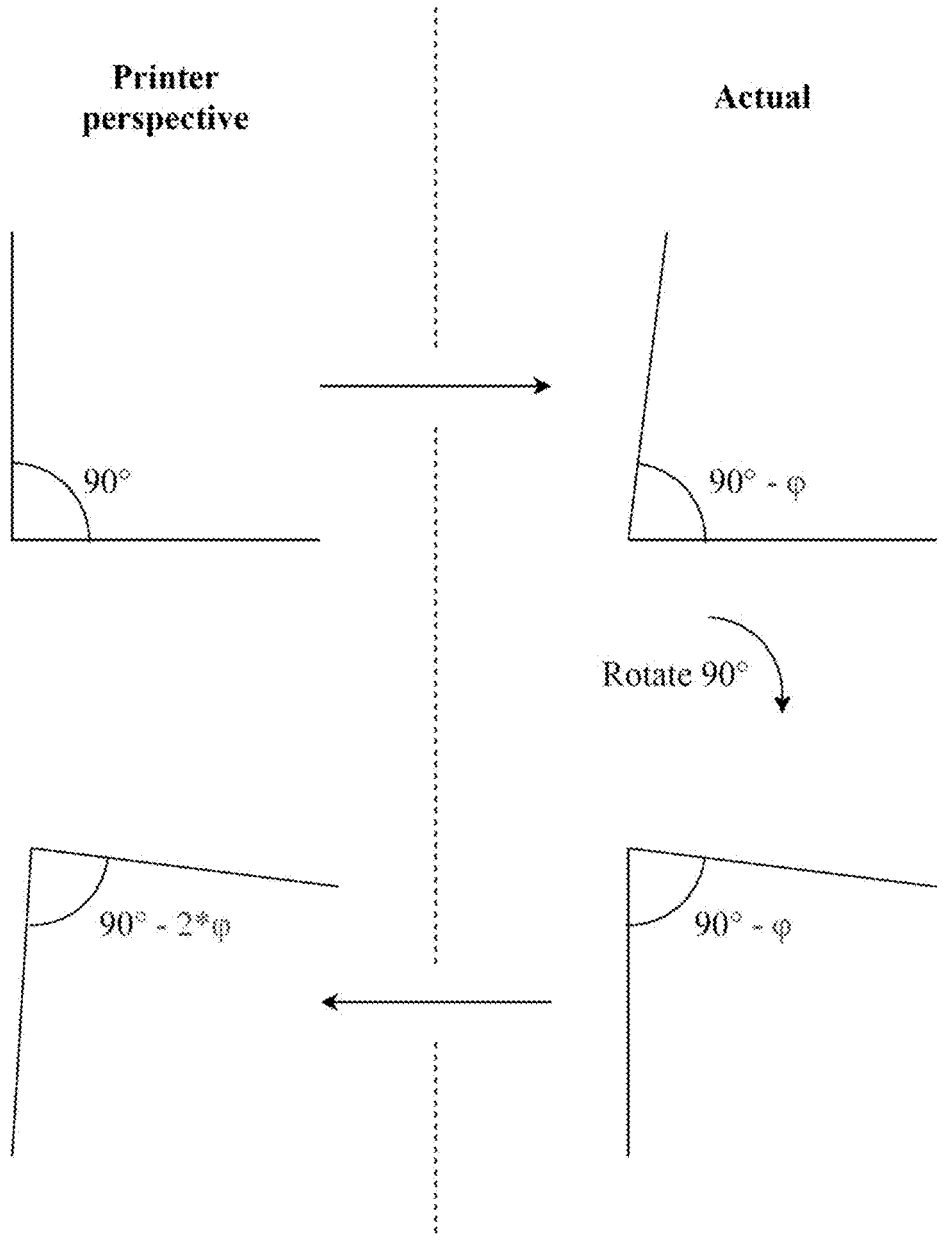
FIG. 8 illustrates viewpoints exposing the observation of X-Y skew, in accordance with one embodiment.

In step S660, the controller 20 determines the amount of X-Y skew of the apparatus 1000, based on the measurements collected in step S650. In one embodiment, the controller 20 may determine the amount of X-Y skew by determining the angle between multiple features of the calibration object 300, based on the measurements collected in step S650. For instance, where the calibration object 300 has first and second features forming an L-shaped pattern at 90 degrees (according to the design specification), the controller 20 may determine the position of the first feature and the position of the second feature based on the measurements, and then determine the angle between the first and second features based on their determined positions. In the case that the actual angle between the first and second features deviates from 90 degrees by an offset angle of $\varphi$ (i.e., the apparatus 1000 is skewed in the X-Y direction by $\varphi$), the measurements (after the rotation of the calibration object 300) will reflect an angle that deviates from 90 degrees by $2\times\varphi$. FIG. 8 illustrates how the X-Y skew is observable by rotating the calibration object 300. As is evident from FIG. 8, the rotation of the calibration object 300 reveals the X-Y skew. Absent such rotation, the measurement of the non-rotated calibration object 300 may not reveal the X-Y skew, given that the measurement component itself is also subject to the X-Y skew.

Operation to Measure Groove on Calibration Object and Determine X-Y Skew

Figure 9:
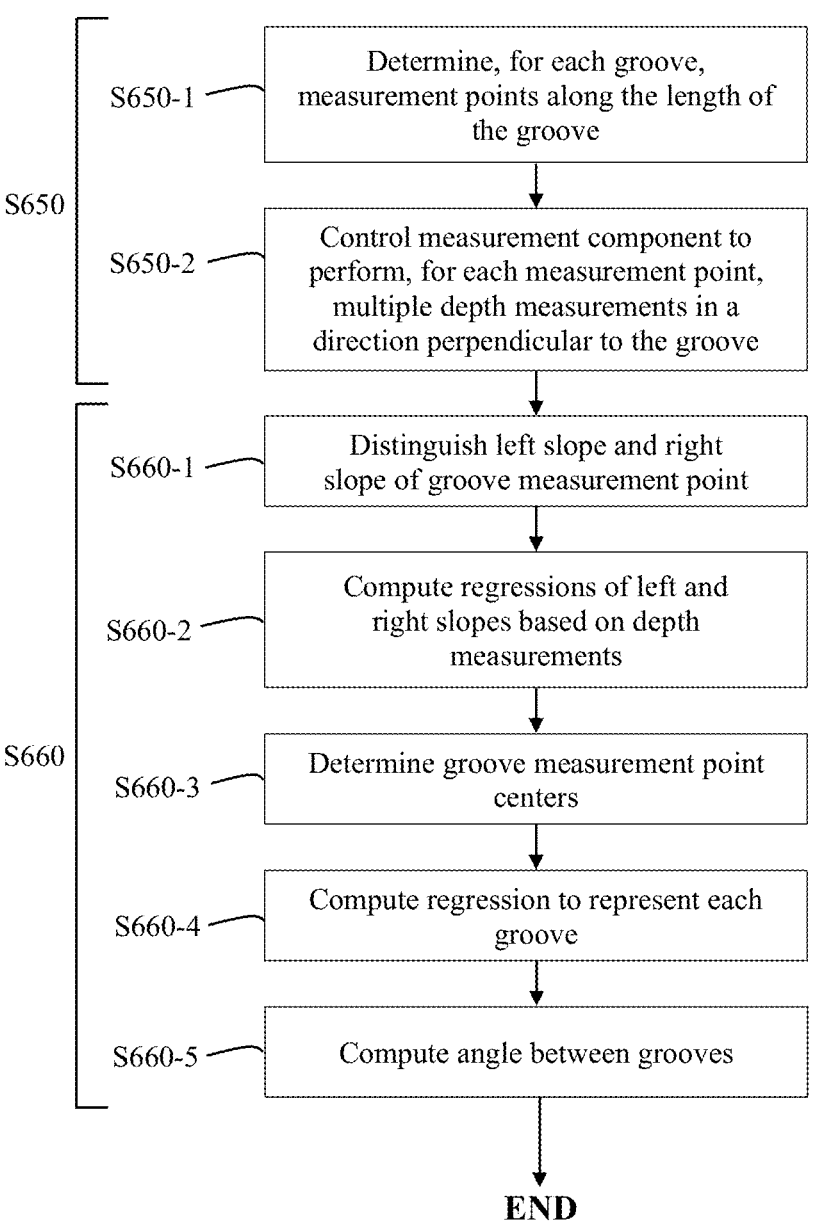
FIG. 9 is a flow chart for measuring a groove on a calibration object and determining X-Y skew, in accordance with one embodiment.

FIG. 9 illustrates more detailed aspects of steps S650 and S660 when determining X-Y skew using a calibration object 300 with features (e.g., the exemplary calibration object as described above). For ease of explanation, the detailed aspects will be described with reference to an L-shaped combined groove on the top surface of the calibration object 300, the L-shape groove formed of a first linear groove extending in a first X-Y direction and a second groove extending in a second X-Y direction designed to form a right angle (i.e., 90 degrees) with the first X-Y direction. Nonetheless, it will be appreciated that these aspects are applicable to other configurations of calibration object 300 features including, but not limited to, features other than grooves and angles other than 90 degrees.

Figure 7:
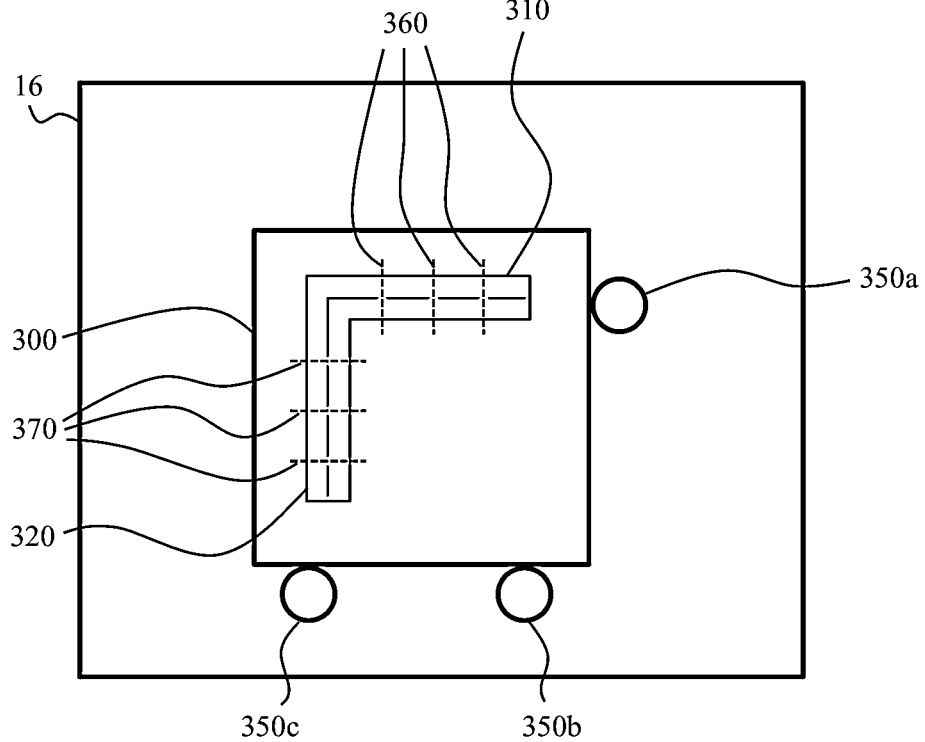
FIG. 7 illustrates an exemplary 3D-printed calibration object, rotated and aligned with reference alignment objects, in accordance with one embodiment.

In step S650-1, the controller 20 determines, for each groove, measurement areas along the length of the groove. For each groove, at least two measurement areas along the length of the groove should be determined, although additional measurement areas may be preferable, to provide more data points for the linear regression performed later in step S660-4. FIG. 7 illustrates example measurement areas 360 for the first groove and measurement areas 370 for the second groove.

Figure 10A:
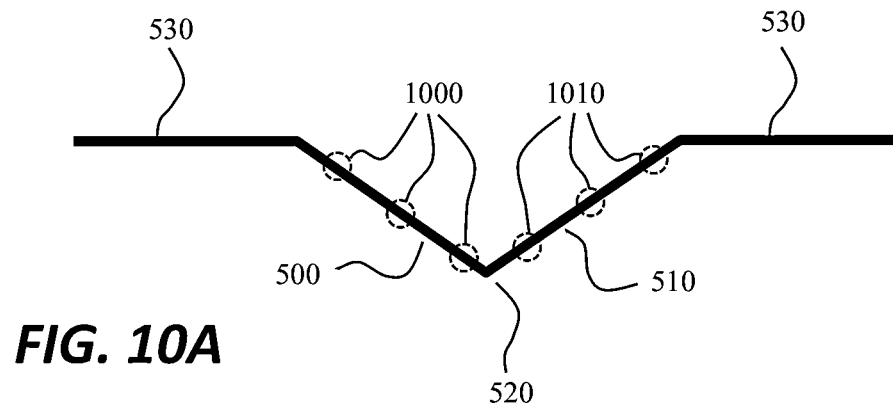
FIGS. 10A-10C are sectional views of the groove features from FIGS. 8A-8C, illustrating measurement sampling points, in accordance with one or more embodiments.
Figure 10B:
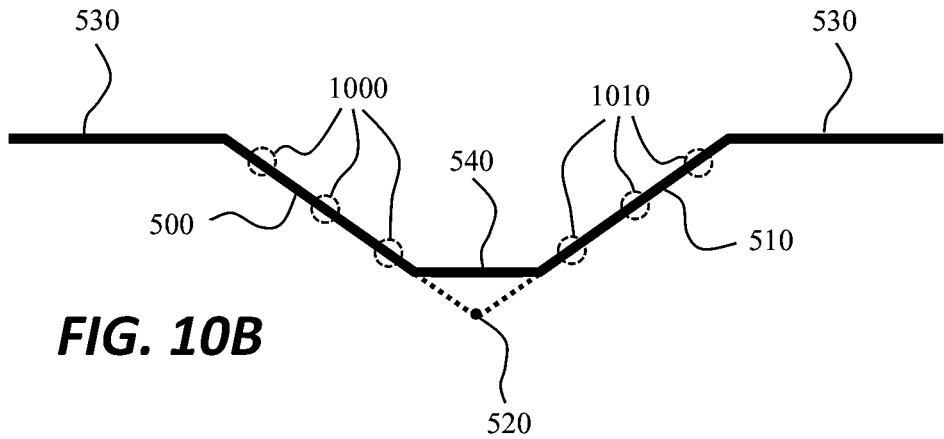
Figure 10C:
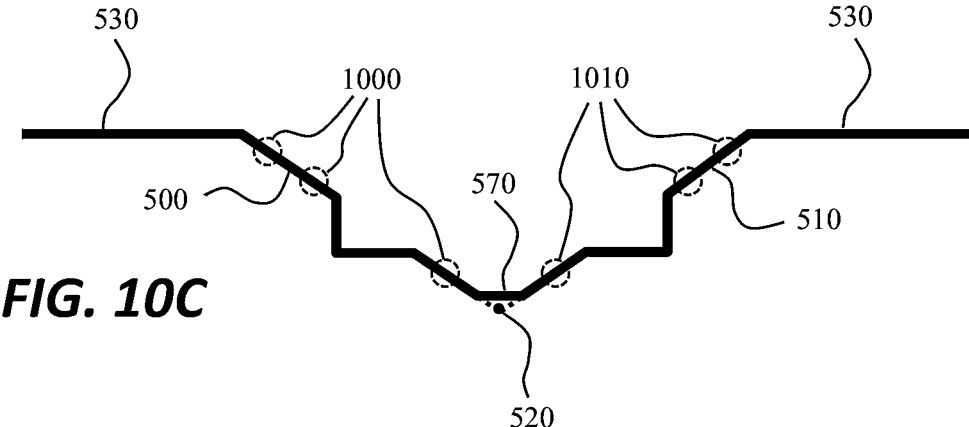

In step S650-2, the controller 20 controls the laser scanner 15 (and/or other measurement component) to perform, for each measurement area, multiple depth measurements in a direction perpendicular to the groove being measured. For instance, FIGS. 10A-10C illustrate examples of measurement points 1000, 1010 in the case of the grooves illustrated in FIGS. 5A-5C. In one embodiment, the controller 20 controls the laser scanner 15 to collect at least ten depth measurements for each measurement point. The controller 20 stores these collected depth measurements in memory 21.

In step S660-1, the controller 20 distinguishes, at least on a coarse basis, the areas of the left and right slopes of each groove measurement point, using the measurements taken along a scan by the laser scanner 15 (and/or other measurement component). For instance, with reference to FIGS. 10A-10C, the controller 20 may distinguish the left slope 500 of each groove measurement point based on continually increasing depth measurements during a measurement scan moving from left to right. The controller 20 may distinguish the right slope 510 based on subsequent depth measurements that begin to decrease after encountering the left slope 500.

In step S660-2, the controller 20 isolates the depth measurements falling within the area of the left slope 500 as distinguished in step S660-1 (examples illustrated in FIGS. 10A-10C as depth measurements 1000), and computes a regression representing the left slope based on these depth measurements. The controller 20 also isolates the depth measurements falling within the area of the right slope 510 as distinguished in step S660-1 (examples illustrated in FIGS. 10A-10C as depth measurements 1010), and computes a regression representing the right slope 510. In one embodiment, the computed regressions are linear regressions. In one embodiment, the computed regressions are higher-order (e.g., polynomial) regressions.

In step S660-3, the controller 20 determines the groove center 520 of each groove measurement point based on the intersections of the two regressions computed in step S660-2. Using this approach, the groove center 520 may be accurately determined even if that precise location was not subject to a depth measurement during the measurement scan, and sub-scan resolution positioning accuracy may be realized. The controller 20 stores these determined groove center positions in memory 21.

In step S660-4, the controller 20 computes a linear regression to represent each of the first linear groove and the second linear groove. That is, for each linear groove, the determinations made in step S660-4 reveal the positions of the groove centers at each measurement point, and a linear regression is computed based on these groove center positions. The controller 20 stores these computed linear regressions in memory 21.

In step S660-5, the controller 20 computes the angle between the first and second linear grooves, based on the computed linear regressions in step S660-4. The controller 20 stores the computed angle in memory 21.

While this operation has been described with reference to the use of reference alignment object(s) 350a-c to guide the re-positioning of the calibration object 300, it will be appreciated that the operation may also be performed without the reference alignment object(s) 350a-c.

Rotation-Induced Error

Although it will be appreciated that the features of the calibration object 300 may be designed with any angle between them, a 90-degree angle may minimize rotation-induced error. The inventors recognized that it is difficult for a user to rotate the calibration object 300 at an exact desired angle, even when the angle is 90 degrees and reference alignment objects are employed. Any error in rotating the calibration object that deviates from the desired angle (e.g., any deviation from 90 degrees) will manifest as an error in skew angle determination. This skew angle estimation error, however, scales with the cosine of the rotation angle R:

$$\text{Skew Angle Estimation Error} = \cos(R) \times \text{skew angle}$$

Figure 11A:
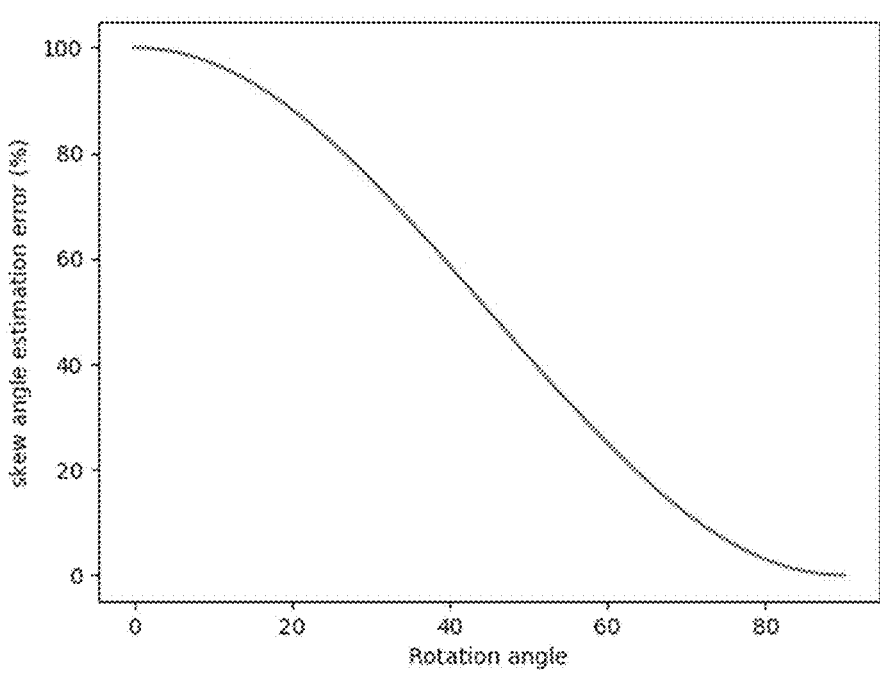
FIG. 11A-11B are graphs illustrating skew angle estimation error as a function of the rotation angle, in accordance with one embodiment.
Figure 11B:
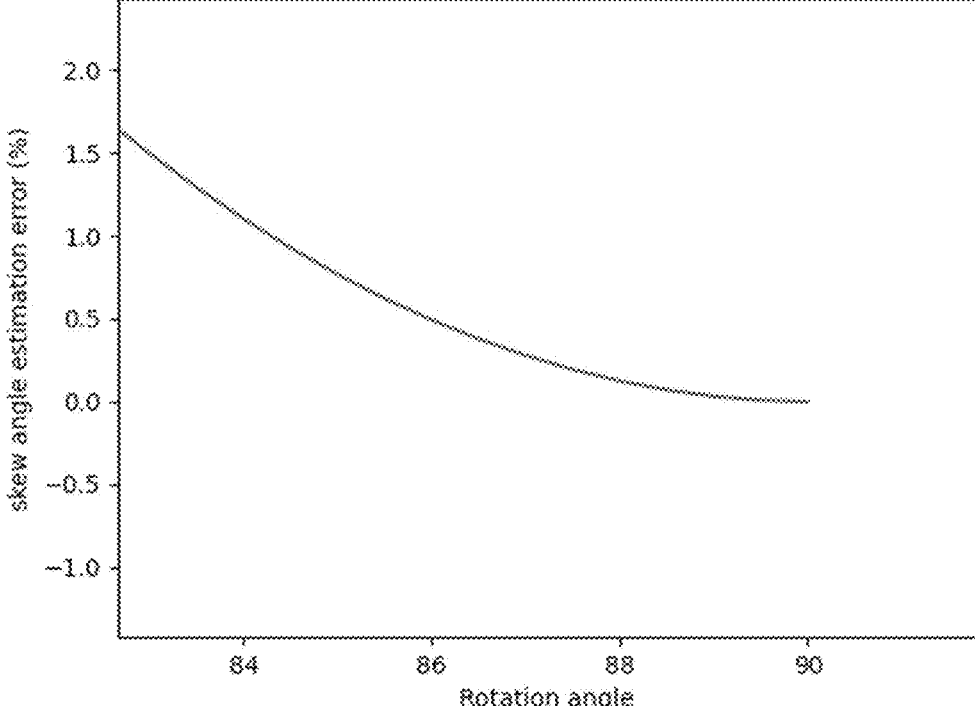

Therefore, the skew angle estimation error asymptotically approaches zero as the rotation angle R approaches 90 degrees. FIGS. 11A-11B illustrate graphs of the skew angle estimation error as a function of the rotation angle. As seen in these figures, for relatively large rotation angle errors, the skew angle estimation error is relatively small. For instance, a rotation angle of 86 degrees results in a skew angle estimation error of only 0.5%. Therefore, the method of skew calibration, as set forth in the present invention, is very robust to user error when the angle between the calibration object features is designed to be 90 degrees.

X-Z and Y-Z Skew Calibration

Once X-Y calibration has been performed, the apparatus 1000 may also perform X-Z and Y-Z skew calibration. This process may be performed by printing additional calibration objects with X-Z and Y-Z aligned features (e.g., L-shaped brackets or a cuboid containing L-shaped features), which are then measured to determine X-Z and Y-Z skew angles, respectively.

Compensation for CTE and/or Moisture Absorption

Another aspect of the present invention relates to compensation for 3D printing with respect to the coefficient of thermal expansion (CTE) and moisture absorption. The inventors recognized that the infill design and structure within the interior of a 3D-printed part may influence the overall dimensional accuracy of the part, especially with respect to CTE and moisture absorption (e.g., swelling). The inventors have further recognized that the amount of CTE may be dependent (and in some instances, highly dependent) on at least (i) the infill type, (ii) the fiber orientation (e.g., CTE may be non-isotropic), and/or (iii) the pathing of the infill (also known as the pathing sequence).

Figure 12:
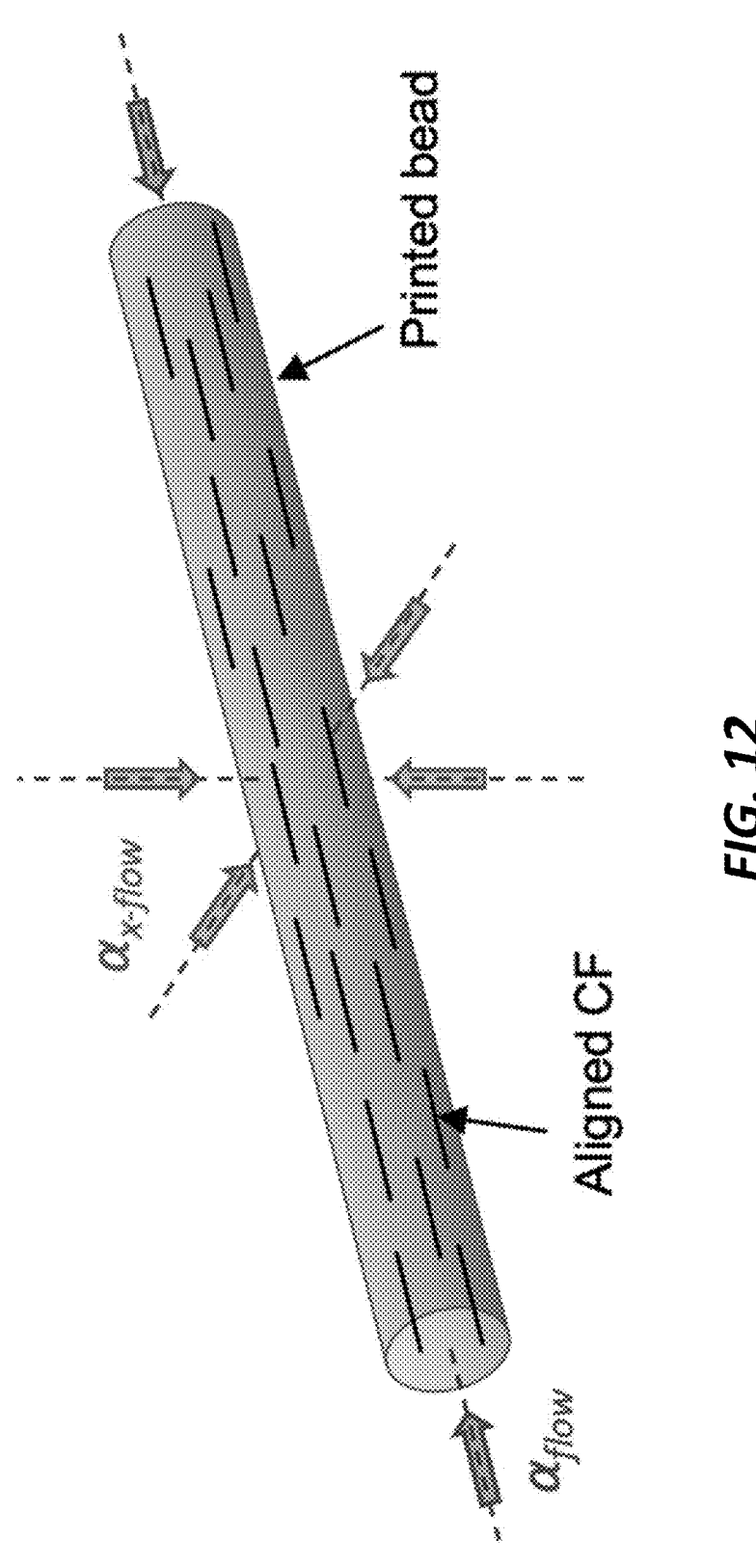
FIG. 12 illustrates a filament bead reinforced with aligned micro carbon fibers.

The inventors analyzed the effects of CTE and moisture absorption on various fused filaments, including, for example, unreinforced nylon-based filaments, nylon-based filaments reinforced with micro carbon fibers, and micro carbon fiber with fillers. The inventors discovered that the CTE of such filaments may be highly dependent on infill pathing due to short carbon fiber (CF) alignment within the printed path. In particular, with respect to the influence of infill pathing on CTE, the CTE may be lower in the longitudinal direction, (i.e., along the length of the path), and may be higher in the transverse direction (i.e., perpendicular to the length of the path), as illustrated in FIG. 12.

More generally, the inventors recognized that the overall CTE in the X-Y direction may depend (and in some instances, may depend heavily) on the infill design, orientation, and pathing sequence for the part. The CTE in the Z direction, while potentially higher overall than the CTE in the X-Y plane, may nonetheless be less sensitive to the orientation of the infill, as the CF strands are oriented within the X-Y plane and perpendicular to the Z-direction.

The inventors further recognized that the overall dimensional accuracy of a 3D-printed part may be influenced by moisture absorption, which may also be dependent on the infill and shell design. Moisture absorption, however, may have a greater dependence on the overall volume percentage of plastic to voids, or the density, and less of a dependence on the alignment of the fibers themselves. Additionally, the inventors observed that for smaller features with a higher shell-to-infill ratio (and higher density), the printed feature expanded more. The inventors also recognized that the use of triangular infill creates different infill structures in identical features located in different areas of the part.

In summary, the inventors discovered that both CTE and moisture absorption may affect the dimensional accuracy of the final 3D-printed part.

Figure 13:
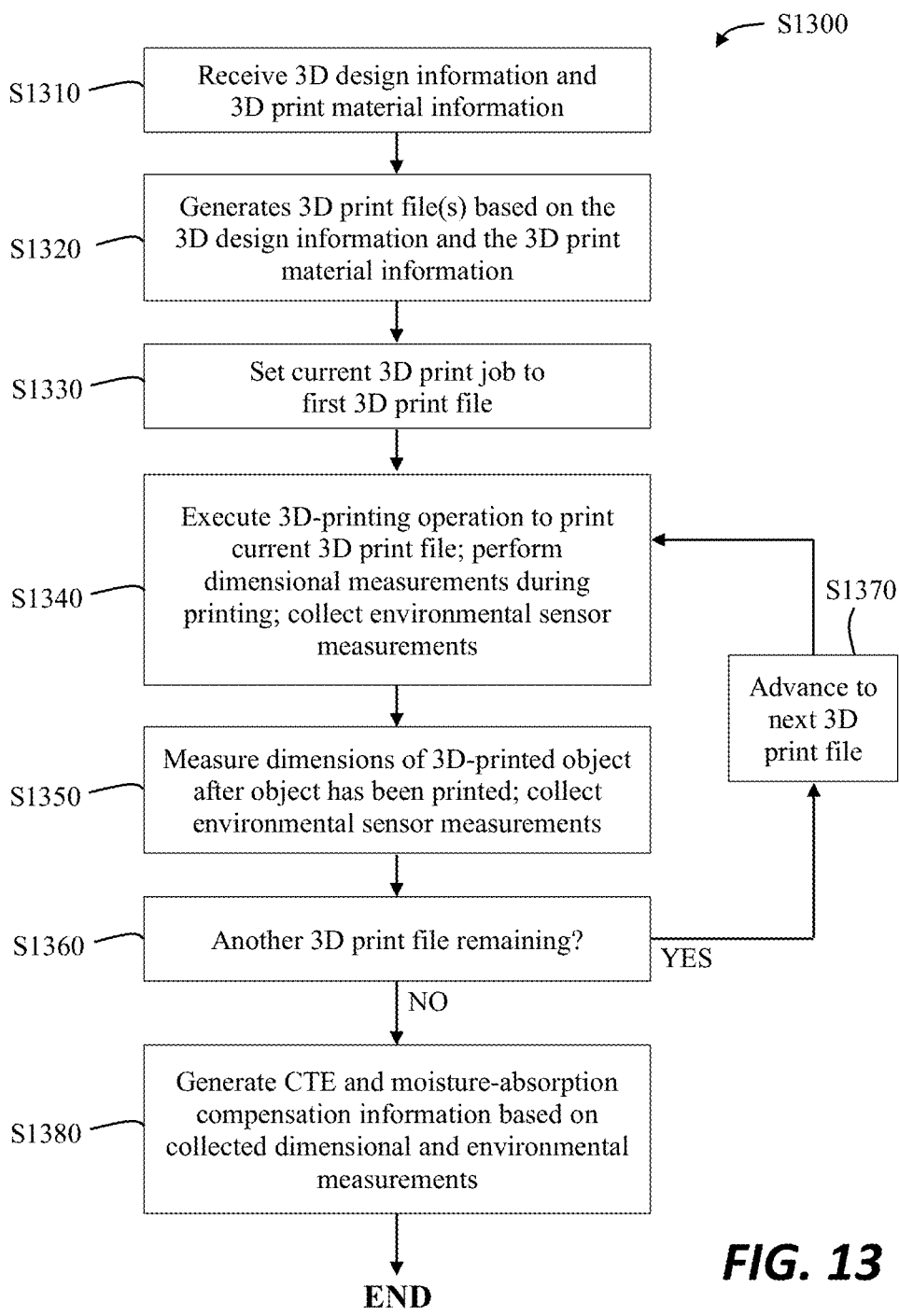
FIG. 13 is a flow chart for determining the effects of CTE and moisture absorption, in accordance with one embodiment.

FIG. 13 illustrates an operation S1300 for determining the effects of CTE and moisture absorption in a 3D printing apparatus. In step S1310, the controller 20 receives 3D design information and 3D print material information. For example, the 3D design information may include a single 3D design, multiple 3D designs, a standard library of printing features, etc.

In step S1320, the controller 20 generates one or more 3D print files based on the 3D design information and the 3D print material information. In one embodiment, the controller 20 generates multiple 3D print files for each 3D design. For example, the controller 20 may, for each 3D design, generate multiple 3D print files that vary print parameters such as, but not limited to, different print pathing, different infill types and/or angles, different infill percentages, different infill directions, different spacing between filament beads, presence vs. absence of a shell on the infill perimeter, part orientation on the build platen, temperature of the build platen and/or 3D printing system, continuous fiber loading, continuous fiber path, plastic material properties, composite (e.g., filled plastic) material properties, and/or other parameters.

In step S1330, the controller 20 sets the current print job to the first 3D print file.

In step S1340, the controller 20 executes a 3D-printing operation to print the current 3D print file. Optionally, the controller 20 controls a measurement component to measure the dimensions of the 3D object one or more times during the printing operation, and controls an environmental sensor component to collect environmental sensor readings (e.g., temperature, humidity, moisture, etc.). The environmental sensor measurements allow the controller 20 to establish a temperature profile of the object being printed. In one embodiment, the measurement component measures an applied filament bead during and after the printing of each additive print layer. The dimensional measurements allow detailed observation of the internal infill structure and tracking of deviations from the expected dimensions. For instance, the measurement component may actively measure the distance, or empty space, between individual beads, which will subsequently be used to form a correlation between such distance and the overall expected CTE in the X-Y plane. For example, the correlation may reflect that the more space between beads (as in with different types of infill), the lower the CTE is in the X-Y plane. The dimensional measurements may also reveal that infill has a higher rate of cooling than a fully filled object, and the cooling may be visible in the dimensional measurements in terms of shrinkage. Using these measurements, the bead width may be configured so it is not excessively small, which may negatively affect the final dimensional accuracy. The controller 20 stores the measurement data in memory 21.

In step S1350, after the 3D-printed object has been formed, the controller 20 controls a measurement component to measure dimensions of the 3D-printed object one or more times, while controlling an environmental sensor component to collect environmental sensor readings (e.g., temperature, humidity, moisture, etc.) at the time of each measurement. For instance, multiple time-lapse measurements may be collected, each at different temperature, humidity, and/or moisture levels. In one embodiment, the printed object may be removed from the build platen 16 and returned to the build platen 16 later for measurement when its temperature and/or moisture absorption properties have changed. The controller 20 stores the measurement data in memory 21.

It will be appreciated that for this operation, the measurement component may be any component capable of measuring the dimensions of the printed object and/or beads within an individual print layer including, but not limited to, laser scanner 15, measurement calipers and/or gauges, and/or an optical camera.

In step S1360, the controller 20 determines whether another 3D print file remains to be printed. If another 3D print file remains to be printed, the operation proceeds to step S1370. If the current 3D print file is the final print file, the operation proceeds to step S1380.

In step S1370, the controller 20 advances to the next 3D print file. The operation then returns to step S1340.

In step S1380, the controller 20 generates CTE and moisture-absorption compensation information based on collected dimensional and environmental sensor measurements. The generated corrective information may include one or more (or all) of infill angle, spacing between adjacent beads, presence vs. absence of shell, etc. For example, the controller 20 may calculate the internal density based on the collected dimensional measurements, and generate compensation information reflecting how individual features are expected to swell in moist environments (e.g., smaller features may have higher shell:infill ratio, therefore are expected to swell more).

Figure 14:
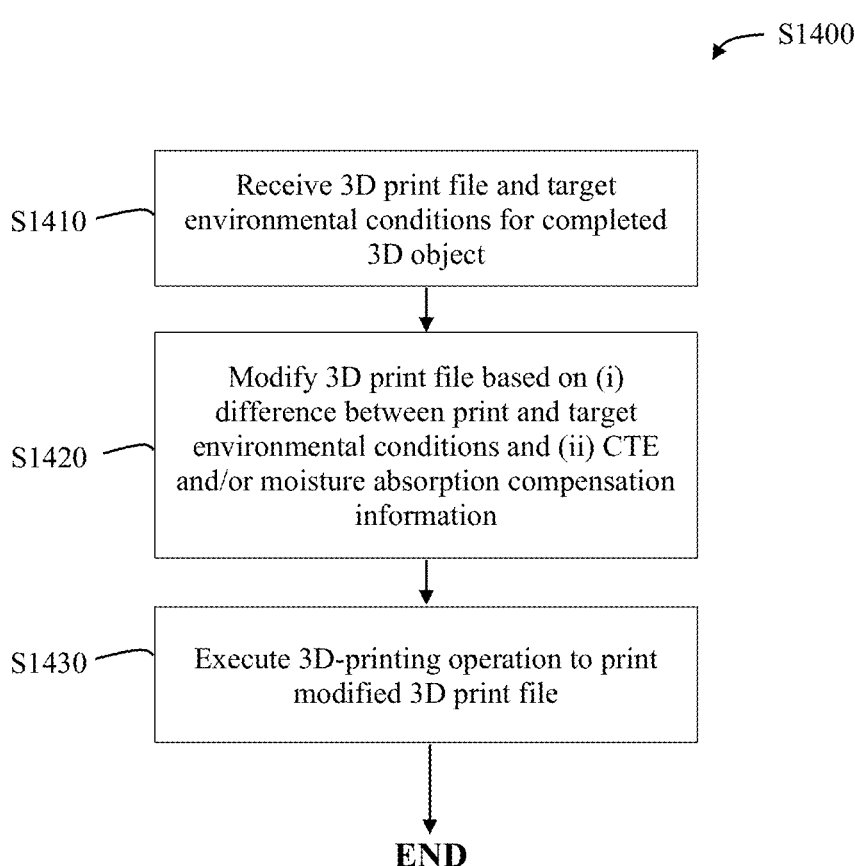
FIG. 14 is a flow chart for correcting for CTE and moisture absorption when performing 3D printing of a part, in accordance with one embodiment.

FIG. 14 illustrates an operation for applying correction for CTE and moisture absorption when performing 3D printing of a part, by modifying a print file.

In step S1410, the controller 20 (or another processor) receives (i) a 3D print file for a 3D object to be printed and (ii) target environmental (e.g., temperature, humidity, and/or moisture) conditions for the service environment in which the completed 3D object (e.g., part of a larger mechanical system) is intended to be used. In one embodiment, the target environmental conditions are received from a user through a user interface. In one embodiment, the target environmental conditions are embedded in the 3D print file itself. In the case that one or more target environmental conditions are not provided, default values may be used instead. As one non-limiting example, 21° C. and 50% relative humidity (which may reflect a typical room temperature and humidity) may be used as default values.

In step S1420, the controller 20 (or another processor) modifies the 3D print file based on the target environmental conditions. More specifically, the modification may include determining the difference between the environmental conditions (e.g., temperature, humidity) between the 3D object during the printing operation and during its use in the service environment (based on the target environmental conditions received in step S1410), and modifying X, Y, and/or Z coordinates based on such difference.

In one embodiment, the modification of X, Y, and/or Z coordinates may involve independent scaling in the X, Y, and Z directions, by a factor in that direction of:

$$1/(\text{environmental condition difference} \times \text{compensation factor})$$

In one embodiment, the scaling may be non-linear, such as to account for non-uniformity in the temperature and/or humidity profile throughout the 3D object being printed and/or in its service environment. As one non-limiting example, the scaling may account for the majority of the 3D object, at the time the print operation is nearly completed, being much cooler than the final few layers of the print operation.

In step S1430, the controller executes a 3D-printing operation to print the modified 3D print file.

Figure 15:
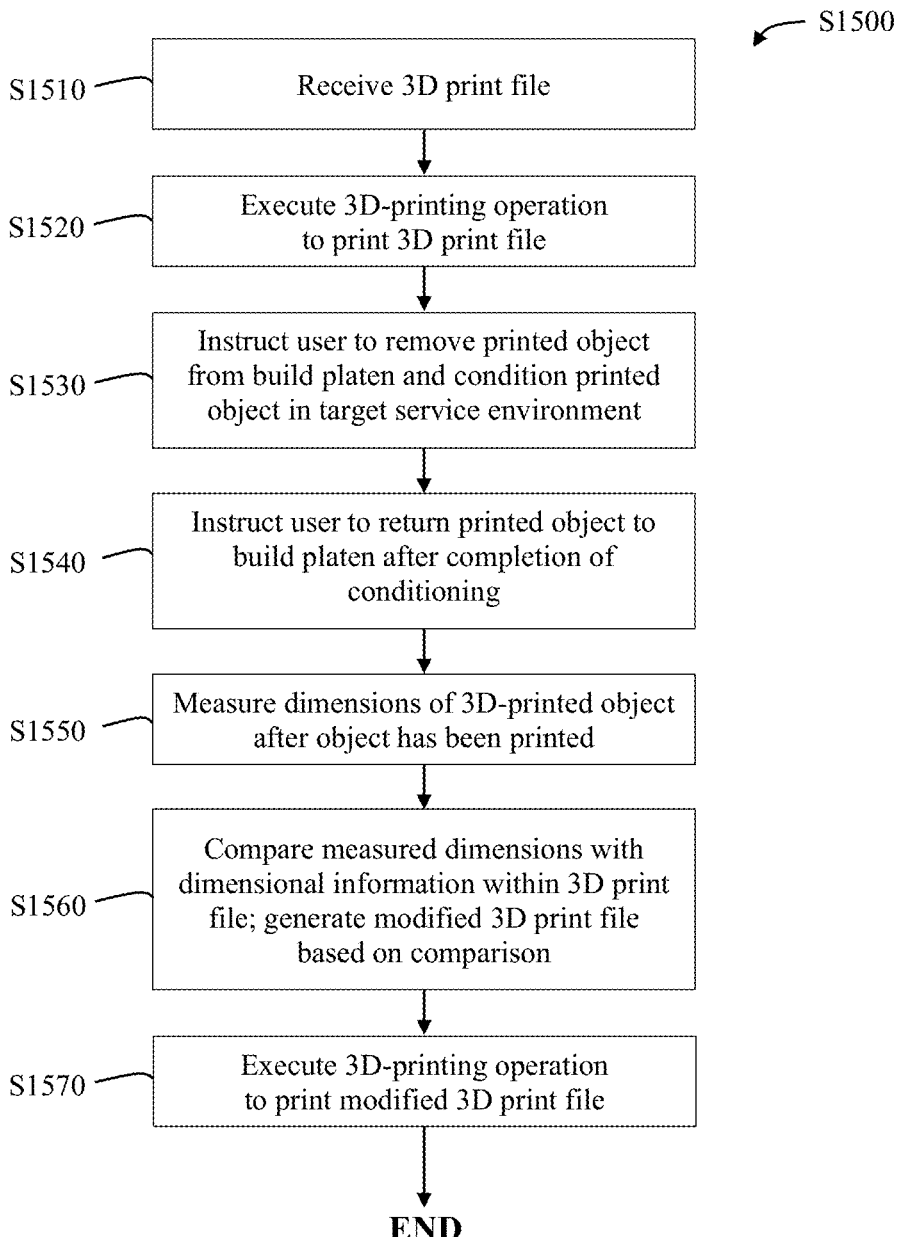
FIG. 15 is a flow chart for correcting for CTE and moisture absorption when performing 3D printing of a part, in accordance with one embodiment.

FIG. 15 illustrates an operation for applying correction for CTE and moisture absorption when performing 3D printing of a part, by scanning and re-printing the part. In step S1510, the controller 20 receives a 3D print file for a 3D object to be printed.

In step S1520, the controller 20 executes a 3D-printing operation to print the 3D print file.

In step S1530, the controller 20 controls a user output component (e.g., display or speaker) to present an instruction (e.g., visual or voice prompt) to the user of the apparatus to remove the printed 3D object, and condition the object in its target service environment (or at least an environment having similar environmental conditions to the target service environment) for a minimum period of time (e.g., one day). By leaving the 3D object to its target service environment, the 3D object is subject to the environmental conditions (e.g., temperature, humidity) of the target service environment and undergoes the CTE and moisture absorption effects resulting from such service environment.

In step S1540, the controller 20 controls a user output component (e.g., display or speaker) to present an instruction (e.g., visual or voice prompt) to the user of the apparatus to return the printed 3D object to the build platen 16 after the object has been conditioned in its target service environment (or like environment with similar environmental conditions).

In step S1550, the controller 20 controls a measurement component (e.g., laser scanner 15) of the apparatus 1000 to measure the dimensional features of the printed 3D object. It will be appreciated that for this operation, the measurement component may be any component capable of measuring the dimensions of the printed object and/or beads within an individual print layer including, but not limited to, laser scanner 15, measurement calipers and/or gauges, and/ or an optical camera. The controller 20 stores the measurement data in memory 21.

In step S1560, the controller 20 compares the collected dimensional measurements with the dimensional information within the 3D print file, and generates a modified 3D print file based on the comparison. The modification of the original 3D print file may include modifying X, Y, and/or Z coordinates within the 3D print file based on the differences between the collected dimensional measurements and the dimensional information within the original 3D print file.

In one embodiment, the modification of X, Y, and/or Z coordinates may involve independent scaling in the X, Y, and Z directions. In one embodiment, the scaling may be non-linear, such as to account for non-uniformity in the temperature and/or humidity profile throughout the 3D object being printed and/or in its service environment. As one non-limiting example, the scaling may account for the majority of the 3D object, at the time the print operation is nearly completed, being much cooler than the final few layers of the print operation.

In step S1570, the controller executes a 3D-printing operation to print the modified 3D print file.

Figure 16:
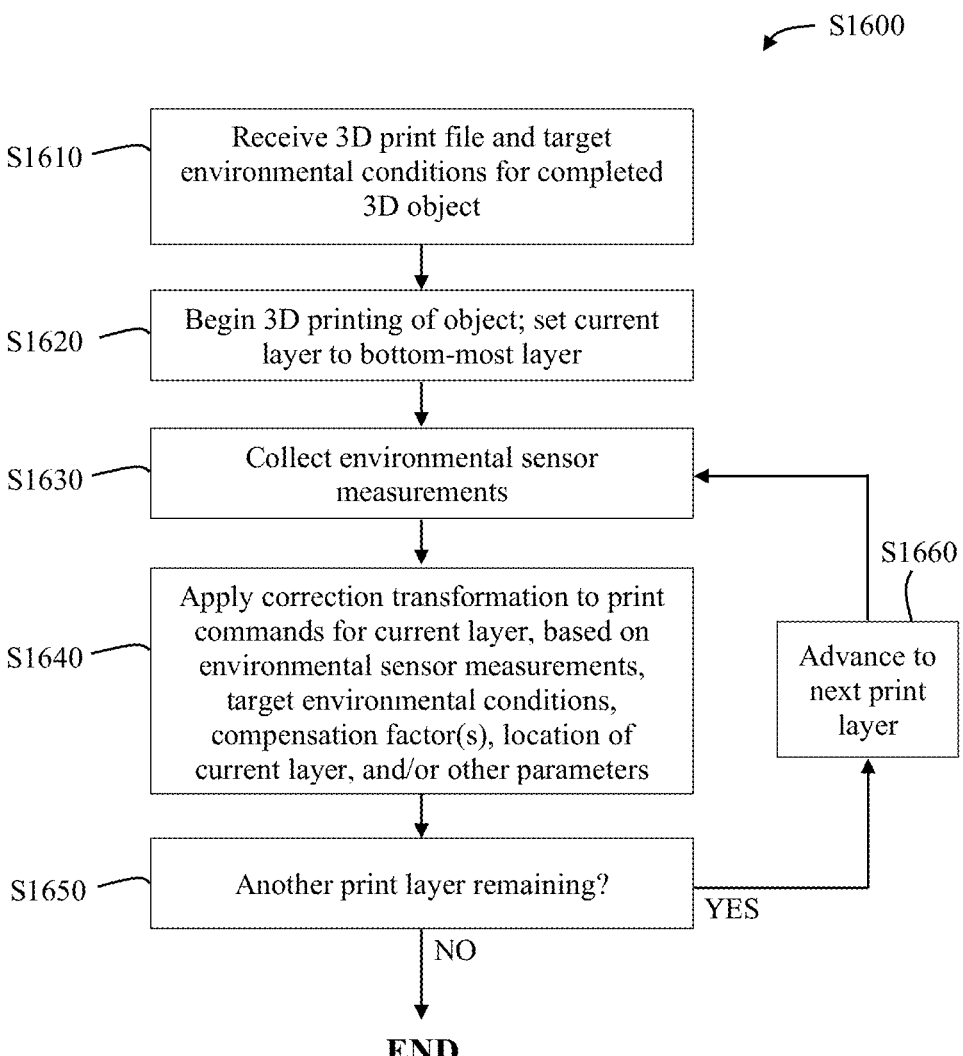
FIG. 16 is a flow chart for correcting for CTE and moisture absorption when performing 3D printing of a part, in accordance with one embodiment.

FIG. 16 illustrates an operation for applying inline correction for CTE and moisture absorption when performing 3D printing of a part.

In step S1610, the controller 20 (or another processor) receives (i) a 3D print file for a 3D object to be printed and (ii) target environmental (e.g., temperature, humidity, and/or moisture) conditions for the service environment in which the completed 3D object (e.g., part of a larger mechanical system) is intended to be used. In one embodiment, the target environmental conditions are received from a user through a user interface. In one embodiment, the target environmental conditions are embedded in the 3D print file itself. In the case that one or more target environmental conditions are not provided, default values may be used instead. As one non-limiting example, 21° C. and 50% relative humidity (which may reflect a typical room temperature and humidity) may be used as default values.

In step S1620, the controller 20 initiates the 3D-printing operation of the object, setting the current layer to be printed as the bottom-most print layer.

In step S1630, the controller 20 controls an environmental sensor component to collect environmental sensor readings (e.g., temperature, humidity, moisture, etc.).

In step S1640, the controller 20 applies a correction transformation to the set of print commands for the current layer to be printed, based on the collected environmental sensor readings, the target environmental conditions, one or more compensation factors to compensate for CTE and/or moisture absorption, the location of the current layer within the 3D object, and/or other parameters.

The modification of the print commands may include modifying X, Y, and/or Z coordinates within the print commands based on the difference between the collected environmental sensor readings, the target environmental conditions, the one or more compensation factors to compensate for CTE and/or moisture absorption, the location of the current layer within the 3D object, and/or other parameters.

In one embodiment, the modification of X, Y, and/or Z coordinates within the print commands may involve independent scaling in the X, Y, and Z directions. In one embodiment, the scaling may be non-linear, such as to account for non-uniformity in the temperature and/or humidity profile throughout the 3D object being printed and/or in its service environment. As one non-limiting example, the scaling may vary between the bottom layers of the 3D object and the top layers of the 3D object, due to cooling that occurs over the course of the print operation.

In step S1650, the controller 20 determines whether another print layer remains to be printed for the object. If another print layer remains to be printed, the operation proceeds to step S1660. If the current print layer is the final print layer, the operation ends.

In step S1660, the controller 20 increments the current print layer to the next layer, thereby advancing to the next layer. Generally, the next layer is the successive layer upwards in height. The operation then returns to step S1630.

It will be appreciated that various corrections may be employed without departing from the spirit of the present invention. As one example, the CTE and moisture absorption changes may be used in an advantageous manner to produce a certain desired configuration (e.g., self locking joints) that otherwise may be difficult to form. It will be appreciated that various design/print parameters may be configured and modified as a result of the determined effects of CTE and moisture absorption including, but not limited to, dimensional scaling, print pathing, infill type, infill density, material flow rate, infill percentage infill direction, part orientation on build platen, temperature of build platen, and/or factors of printing that may have different dimensional shrinkage/swelling rates in different environments (temperature, chemical exposure, applied load, vacuum, etc.).

Moreover, various measurements may be conducted to determine the effects of CTE and moisture absorption, with the measurements used to determine the relationship between temperature and thermal/moisture expansion for the individual 3D printing system (which accounts for printer to printer and ambient conditions variations). As another variant, dimensional measurements may be taken in all X, Y, and Z directions. Alternatively, dimensional measurements may be taken only in the Z direction, and the X and Y dimensional deviations are determined based on the Z-direction measurements and already-determined relationship between X/Y and Z directions as to the influence of CTE and moisture absorption.

Other Embodiments

Incorporation by reference is hereby made to U.S. Pat. Nos. 10,076,876, 9,149,988, 9,579,851, 9,694,544, 9,370,896, 9,539,762, 9,186,846, 10,000,011, 10,464,131, 9,186,848, 9,688,028, 9,815,268, 10,800,108, 10,814,558, 10,828,698, 10,953,609, U.S. Patent Application Publication No. 2016/0107379, U.S. Patent Application Publication No. 2019/0009472, U.S. Patent Application Publication No. 2020/0114422, U.S. Patent Application Publication No. 2020/0361155, U.S. Patent Application Publication No. 2020/0371509, and U.S. Provisional Patent Application No. 63/138,987 in their entireties.

Although this invention has been described with respect to certain specific exemplary embodiments, many additional modifications and variations will be apparent to those skilled in the art in light of this disclosure. For instance, while reference has been made to an X-Y Cartesian coordinate system, it will be appreciated that the aspects of the invention may be applicable to other coordinate system types (e.g., radial). It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:
1. An apparatus comprising:
a printer component;
at least one processor; and
at least one memory,
wherein the at least one memory stores computer-readable instructions which, when executed by the at least one processor, cause the at least one processor to:
control the printer component to print a 3D object, the 3D object containing a first feature extending along a first direction and a second feature extending along a second direction different from the first direction;

control the printer component to print a reference alignment object configured to abut the 3D object after the 3D object has been rotated to a rotated position to abut the 3D object;
receive measurement data corresponding to positional measurements of the first feature and the second feature of the 3D object in the rotated position; and
determine an amount of skew of the printer component, based on the received measurement data.
2. The apparatus of claim 1, wherein at least one of the first and second features is a groove.
3. The apparatus of claim 1, wherein the first feature is a first groove and the second feature is a second groove, and wherein the positional measurements of the first groove and the second groove include multiple measurement points along the length of each groove.
4. The apparatus of claim 3, wherein the at least one processor receives multiple measurements along the width of the respective groove at each measurement point.
5. The apparatus of claim 4, wherein the determining of an amount of skew of the printer component includes determining, for each measurement point, the location of the bottom of the respective groove based on the multiple measurements along the width of the respective groove.
6. The apparatus of claim 1, wherein the second direction is perpendicular to the first direction.
7. The apparatus of claim 1, wherein the computer-readable instructions, when executed by the at least one processor, further cause the at least one processor to:
control a printer component to print a plurality of reference alignment objects, wherein the receiving is performed after the 3D object has been printed and has been rotated by a predetermined angle to abut the plurality of reference alignment objects.
8. The apparatus of claim 7, wherein at least one of the first regression and the second regression is a linear regression.
9. The apparatus of claim 1, wherein the determining of an amount of skew of the printer component includes performing a first regression based on the received measurement data corresponding to the first feature, and performing a second regression based on the received measurement data corresponding to the second feature.
10. A method comprising:
controlling, by at least one processor, a printer component to print a 3D object, the 3D object containing a first feature extending along a first direction and a second feature extending along a second direction different from the first direction;
controlling the printer component to print a reference alignment object;
receiving, by at least one processor, after the 3D object has been printed and has been rotated by a predetermined angle to abut the reference alignment object, measurement data corresponding to positional measurements of the first feature and the second feature; and
determining, by at least one processor, an amount of skew of the printer component, based on the received measurement data.
11. The method of claim 10, wherein at least one of the first and second features is a groove.
12. The method of claim 10, wherein the first feature is a first groove and the second feature is a second groove, and wherein the positional measurements of the first groove and the second groove include multiple measurement points along the length of each groove.

13. The method of claim 12, wherein each measurement point includes multiple measurements along the width of the respective groove.

14. The method of claim 13, wherein the determining of an amount of skew of the printer component includes determining, for each measurement point, the location of the bottom of the respective groove based on the multiple measurements along the width of the respective groove.

15. The method of claim 10, wherein the second direction is perpendicular to the first direction.

16. The method of claim 10, further comprising:

controlling a printer component to print a plurality of reference alignment objects, wherein the receiving is performed after the 3D object has been printed and has been rotated by a predetermined angle to abut the plurality of reference alignment objects.

17. The method of claim 16, wherein at least one of the first regression and the second regression is a linear regression.

18. The method of claim 10, wherein the determining of an amount of skew of the printer component includes performing a first regression based on the received measurement data corresponding to the first feature, and performing a second regression based on the received measurement data corresponding to the second feature.

* * * * *